United States Patent
Einhaus et al.

(10) Patent No.: US 10,728,918 B2
(45) Date of Patent: Jul. 28, 2020

(54) UPLINK TRANSMISSIONS IN UNLICENSED CELLS WITH ADDITIONAL TRANSMISSION TIMING OFFSETS

(71) Applicant: Panasonic Intellectual Property Corporation of America, Torrance, CA (US)

(72) Inventors: Michael Einhaus, Darmstadt (DE); Jan Ohlhorst, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 109 days.

(21) Appl. No.: 15/767,983

(22) PCT Filed: Oct. 10, 2016

(86) PCT No.: PCT/EP2016/074218
§ 371 (c)(1),
(2) Date: Apr. 12, 2018

(87) PCT Pub. No.: WO2017/064004
PCT Pub. Date: Apr. 20, 2017

(65) Prior Publication Data
US 2018/0302915 A1 Oct. 18, 2018

(30) Foreign Application Priority Data
Oct. 16, 2016 (EP) ...................................... 15190257

(51) Int. Cl.
*H04W 72/12* (2009.01)
*H04W 72/02* (2009.01)
(Continued)

(52) U.S. Cl.
CPC ....... *H04W 72/1268* (2013.01); *H04W 16/14* (2013.01); *H04W 72/0446* (2013.01); *H04W 72/1215* (2013.01); *H04W 72/02* (2013.01)

(58) Field of Classification Search
None
See application file for complete search history.

(56) References Cited

U.S. PATENT DOCUMENTS 10,506,634 B2 * 12/2019 You ...................... H04W 74/006
2013/0294242 A1 * 11/2013 Zhao ................. H04W 72/1252
370/235
(Continued)

OTHER PUBLICATIONS

3GPP TS 36.212 V12.6.0, "3rd Generation Partnership Project; Technical Specification Group Radio Access Network; Evolved Universal Terrestrial Radio Access (E-UTRA); Physical Channels and Modulation (Release 12)," Jun. 2015, 136 pages.
(Continued)

*Primary Examiner* — Ajit Patel
(74) *Attorney, Agent, or Firm* — Seed IP Law Group LLP

(57) ABSTRACT

The invention relates to a radio base station or user equipment for scheduling respectively performing uplink transmissions via an unlicensed cell configured between the user equipment and the radio base station. The UE can perform an uplink transmission via the unlicensed cell according to at least the following types. A first type spans a complete subframe duration and starts and ends at subframe boundaries followed by the UE. A second type spans a complete subframe duration and includes an additional time offset with respect to the subframe boundaries followed by the UE. A third type spans less than a complete subframe duration and includes an additional time offset with respect to the subframe boundaries followed by the UE. The UEs perform uplink transmissions according to one of the types in such a
(Continued)

manner that at least between two directly-subsequent uplink transmissions a time gap with no uplink transmission occurs.

20 Claims, 14 Drawing Sheets

(51) Int. Cl.
*H04W 16/14* (2009.01)
*H04W 72/04* (2009.01)

(56) References Cited

U.S. PATENT DOCUMENTS

| | | | |
|---|---|---|---|
| 2014/0079015 A1 | 3/2014 | Kim et al. | |
| 2015/0085797 A1* | 3/2015 | Ji | H04J 13/10 370/329 |
| 2015/0092703 A1* | 4/2015 | Xu | H04L 5/003 370/329 |
| 2015/0098437 A1 | 4/2015 | Chen et al. | |
| 2015/0201431 A1 | 7/2015 | Um et al. | |
| 2015/0358826 A1* | 12/2015 | Wei | H04W 74/0816 370/329 |
| 2015/0365880 A1* | 12/2015 | Malladi | H04W 48/08 370/312 |
| 2016/0095134 A1* | 3/2016 | Chen | H04L 1/1822 370/336 |
| 2016/0278050 A1* | 9/2016 | Nory | H04W 16/14 |
| 2016/0330010 A1* | 11/2016 | Qin | H04L 5/0058 |
| 2017/0118748 A1* | 4/2017 | Kalhan | H04W 76/14 |
| 2017/0318473 A1* | 11/2017 | Futaki | H04W 16/14 |

OTHER PUBLICATIONS

3GPP TS 36.212 V12.6.0, "3$^{rd}$ Generation Partnership Project; Technical Specification Group Radio Access Network; Evolved Universal Terrestrial Radio Access (E-UTRA); Multiplexing and channel coding (Release 12)," Sep. 2015, 95 pages.

3GPP TS 36.212 V12.6.0, "3$^{rd}$ Generation Partnership Project; Technical Specification Group Radio Access Network; Evolved Universal Terrestrial Radio Access (E-UTRA); Physical layer procedures (Release 15)," Mar. 2018, 486 pages.

3GPP TS 36.212 V12.6.0, "3$^{rd}$ Generation Partnership Project; Technical Specification Group Radio Access Network; Evolved Universal Terrestrial Radio Access (E-UTRA); Medium Access Control (MAC) protocol specification (Release 12)," Sep. 2015, 77 pages.

3GPP TS 36.212 V12.6.0, "3$^{rd}$ Generation Partnership Project; Technical Specification Group Radio Access Network; Study on Licensed-Assisted Access to Unlicensed Spectrum (Release 13)," Jun. 2015, 285 pages.

Alcatel-Lucent, Alcatel-Lucent Shanghai Bell, Coolpad, Ericsson, ETRI, Huawei, HiSilicon, IAESI, InterDigital, LG, Nokia Corporation, Nokia Networks, Qualcomm, NTT Docomo, Panasonic, Samsung, TI, Verizon Wireless, ZTE, "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Oct. 6-10, 2014, 26 pages.

ETSI EN 301 893 V1.8.0, "Broadband Radio Access Networks (BRAN); 5 GHz high performance RLAN; Harmonized EN covering the essential requirements of article 3.2 of the R&TTE Directive," Jan. 2015, 93 pages.

ETSI EN 301 893 V1.8.1, "Broadband Radio Access Networks (BRAN); 5 GHz high performance RLAN; Harmonized EN covering the essential requirements of article 3.2 of the R&TTE Directive," Mar. 2015, 93 pages.

Extended European Search Report, dated Apr. 1, 2016, for corresponding European Patent Application No. 15190257.4-1857, 4 pages.

International Search Report, dated Aug. 12, 2016, for related International Patent Application No. PCT/EP2016/074218, 3 pages.

Samsung, "Discussion on LBT for LAA UL," R1-1510149, 3GPP TSG RAN WG1 Ad-hoc Meeting, Agenda item: 2.2, Paris, France, Mar. 24-26, 2015, 5 pages.

Sesia et al., "LTE The UMTS Long Term Evolution—From Theory to Practice," John Wiley & Sons Ltd., 2009, Chapters 9.3 and 20.2, 27 pages.

* cited by examiner

LAA scenario,
UL transmissions via unlicensed cell

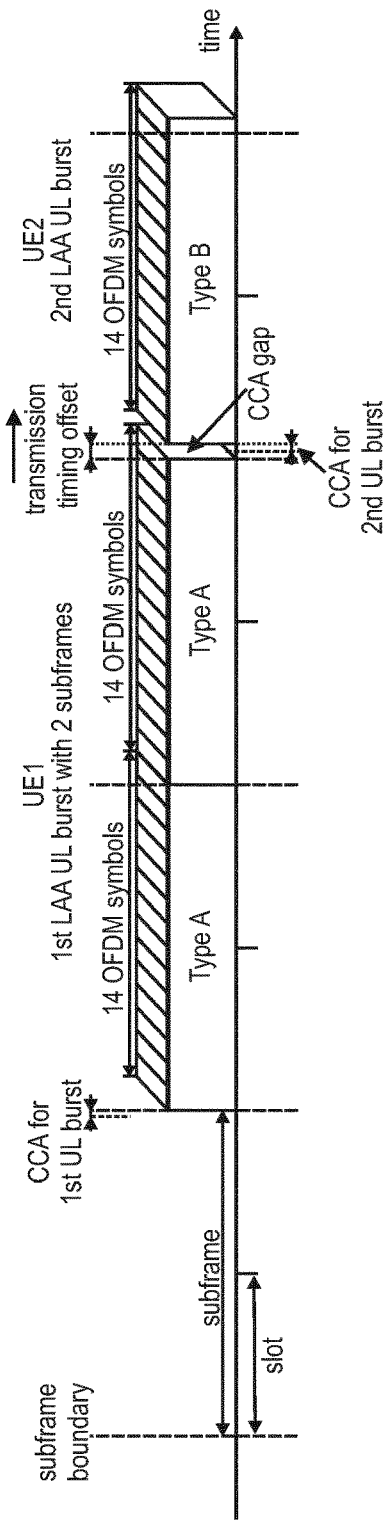

UPLINK TRANSMISSIONS IN UNLICENSED CELLS WITH ADDITIONAL TRANSMISSION TIMING OFFSETS

BACKGROUND

Technical Field

The present disclosure relates to a radio base station for scheduling uplink transmissions and to a user equipment for performing the scheduled uplink transmission, as well as methods for operating respectively the radio base station and the user equipment. The present disclosure is also providing a corresponding system comprising the user equipment and a radio base station.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade.

The work item (WI) specification on Long-Term Evolution (LTE) called Evolved UMTS Terrestrial Radio Access (UTRA) and evolved UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block." A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 12)," current version 12.6.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair," or equivalent "RB pair" or "PRB pair." The term "component carrier" refers to a combination of several resource blocks in the frequency domain. In future releases of LTE, the term "component carrier" is no longer used; instead, the terminology is changed to "cell," which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP).

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n □ 300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmission(s) need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured at the moment for one UE.

The configuration and reconfiguration, as well as addition and removal, of component carriers can be performed by RRC. Activation and deactivation is done e.g., via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink. When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink/Downlink Scheduling

A MAC function in the eNodeB refers to scheduling, by which the eNB distributes the available radio resources in one cell among the UEs and among the radio bearers for each UE. In principle, the eNodeB allocates the downlink and uplink resources to each UE based on respectively the downlink data buffered in the eNodeB and based on buffer status reports (BSRs) received from the UE. In this process, the eNodeB considers the QoS requirements of each configured radio bearer and selects the size of the MAC PDU.

The usual mode of scheduling is dynamic scheduling, by means of downlink grant/assignment messages (DCIs) for the allocation of downlink transmission resources and uplink grant/assignment messages for the allocation of uplink transmission resources. They are transmitted on the physical downlink control channel (PDCCH) using a cell radio network temporary identifier (C-RNTI) to identify the intended UE. In addition to the dynamic scheduling, persistent scheduling is defined, which enables radio resources to be semi-statically configured and allocated to a UE for a longer time period than one subframe, thus avoiding the need for specific downlink assignment messages or uplink grant messages over the PDCCH for each subframe. For the configuration or reconfiguration of a persistent schedule, RRC signaling indicates the resource allocation interval at which the radio resources are periodically assigned. When the PDCCH is used to configure or reconfigure a persistent schedule, it is necessary to distinguish the scheduling messages which apply to a persistent schedule from those used for dynamic scheduling. For this purpose, a special scheduling identity is used, known as the semi-persistent scheduling C-RNTI, SPS-C-RNTI, which for each UE is different from the C-RNTI used for dynamic scheduling messages.

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

Downlink control information occurs in several formats that differ in overall size and also in the information contained in their fields. The different DCI formats that are currently defined for LTE are described in detail in 3GPP TS 36.212, "Multiplexing and channel coding," section 5.3.3.1 (current version v12.6.0 available at http://www.3gpp.org and incorporated herein by reference). For detailed information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference. Additional formats may be defined in the future.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, 3GPP Release 11 introduced an EPDCCH that fulfills basically the same function as the PDCCH, i.e., conveys L1/L2 control signaling, even though the detailed transmission methods are different from the PDCCH. Further details can be found in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

Format 5: DCI format 5 is used for the scheduling of the PSCCH (Physical Sidelink Control Channel), and also contains several SCI format 0 fields used for the scheduling of the PSSCH (Physical Sidelink Shared Control Channel). If the number of information bits in DCI format 5 mapped onto a given search space is less than the payload size of format 0 for scheduling the same serving cell, zeros shall be appended to format 5 until the payload size equals that of format 0 including any padding bits appended to format 0.

Timing Advance

For the uplink transmission scheme of 3GPP LTE, single-carrier frequency division multiple access (SC-FDMA) was chosen to achieve an orthogonal multiple-access in time and frequency between the different user equipments transmitting in the uplink. Uplink orthogonality is maintained by ensuring that the transmissions from different user equipments in a cell are time-aligned at the receiver of the eNodeB. This avoids intra-cell interference occurring, both between user equipments assigned to transmit in consecutive sub-frames and between user equipments transmitting on adjacent subcarriers. Time alignment of the uplink transmissions is achieved by applying a timing advance at the user equipment's transmitter, relative to the received downlink timing as exemplified in FIGS. 3 and 4. The main role of this is to counteract differing propagation delays between different user equipments.

FIG. 3 illustrates the misalignment of the uplink transmissions from two mobile terminals in case no uplink timing alignments is performed, such that the eNodeB receives the respective uplink transmissions from the two mobile terminals at different timings.

FIG. 4 in contrast thereto illustrates synchronized uplink transmissions for two mobile terminals. The uplink timing alignment is performed by each mobile terminal and applied to the uplink transmissions such that at the eNodeB the uplink transmissions from the two mobile terminals arrive at substantially the same timing.

The user equipment specific timing advance determines therefore the uplink transmission timing from user equipment point of view. The reference for the timing advance is the downlink subframe boundary timing as seen from user equipment point of view as shown in FIG. 4.

The transmission timing adjustment for LTE uplink transmissions is described in detail in 3GPP TS 36.213, clause 4.2.3 and in 3GPP TS 36.211, clause 8.1 respectively incorporated herein by reference.

Initial Timing Advance Procedure

When user equipment is synchronized to the downlink transmissions received from eNodeB, the initial timing advance is set by means of the random access procedure as described below. The user equipment transmits a random access preamble based on which the eNodeB can estimate the uplink timing. The eNodeB responds with an 11-bit initial timing advance command contained within the Random Access Response (RAR) message. This allows the timing advance to be configured by the eNodeB with a granularity of 0.52 µs from 0 up to a maximum of 0.67 ms.

Additional information on the control of the uplink timing and timing advance on 3GPP LTE (Release 8/9) can be found in chapter 20.2 of Stefania Sesia, Issam Toufik and Matthew Baker, "LTE—The UMTS Long Term Evolution: From Theory to Practice," John Wiley & Sons, Ltd. 2009, which is incorporated herein by reference.

Updates of the Timing Advance

Once the timing advance has been first set for each user equipment, the timing advance is updated from time to time to counteract changes in the arrival time of the uplink signals at the eNodeB. In deriving the timing advance update commands, the eNodeB may measure any uplink signal which is useful. The details of the uplink timing measurements at the eNodeB are not specified, but left to the implementation of the eNodeB.

The timing advance update commands are generated at the Medium Access Control (MAC) layer in the eNodeB and transmitted to the user equipment as MAC control elements which may be multiplexed together with data on the Physical Downlink Shared Channel (PDSCH). Like the initial timing advance command in the response to the Random Access Channel (RACH) preamble, the update commands have a granularity of 0.52 µs (corresponding to 16×Ts, where Ts is the basic LTE air interface time unit of 1/(15000×2048) seconds). The range of the update commands is ±16 µs, allowing a step change in uplink timing equivalent to the length of the extended cyclic prefix. They would typically not be sent more frequently than about every 2 seconds. In practice, fast updates are unlikely to be necessary, as even for a user equipment moving at 500 km/h the change in round-trip path length is not more than 278 m/s, corresponding to a change in round-trip time of 0.93 µs/s.

The eNodeB balances the overhead of sending regular timing update commands to all the UEs in the cell against a UE's ability to transmit quickly when data arrives in its transmit buffer. The eNodeB therefore configures a timer for each user equipment, which the user equipment restarts each time a timing advance update is received. In case the user equipment does not receive another timing advance update before the timer expires, it must then consider that it has lost uplink synchronization (see also section 5.2 of 3GPP TS 36.321, "Evolved Universal Terrestrial Radio Access (E-UTRA); Medium Access Control (MAC) protocol specification," version 12.7.0, available at http://www.3gpp.org and incorporated herein by reference).

In such a case, in order to avoid the risk of generating interference to uplink transmissions from other user equipments, the UE is not permitted to make uplink transmissions of any sort (except the transmission of a random access preamble) and needs to revert to the initial timing alignment procedure in order to restore the uplink timing.

Upon reception of a timing advance command, the user equipment shall adjust its uplink transmission timing for PUCCH/PUSCH/SRS of the primary cell. The timing advance command indicates the change of the uplink timing relative to the current uplink timing as multiples of 16 $T_s$.

Timing Advance and Component Carrier Aggregation in the Uplink

Until Release 10 of the 3GPP standards the UE had to maintain only one timing advance value and apply it to UL transmissions on all aggregated component carriers. Only the aggregation of cells within the same frequency band, also referred to as intra-frequency carrier aggregation, was supported. Basically uplink timing synchronization is performed for the PCell, e.g., by RACH procedure on PCell, and the UE uses the same uplink timing for uplink transmissions on aggregated SCells. Since Release 11, uplink component cells can be aggregated from different bands; they can therefore experience different channel, interference and coverage characteristics. Deployment scenarios with frequency-selective repeaters or remote radio heads may furthermore require a separate timing advance for certain serving cells due to different propagation delays among the aggregated serving cells.

There might be a separate timing advance (TA) for each aggregated serving cell, Cells are therefore grouped, and each group has a separate timing advance. Essentially (serving) cells having UL to which the same TA applies (typically corresponding to the serving cells hosted by the same receiver) and using the same timing reference are grouped into a so called TA group. Each TA group contains at least one serving cell with configured uplink, and the mapping of each serving cell to a TA group is configured by the serving eNB with RRC signaling. When an SCell is configured for aggregation, the eNB will assign the SCell to a TA group. The mapping between SCell and TA group may be reconfigured by RRC signaling. A UE supporting multiple TAs is required to support at least two TA groups; i.e., one TA group containing the PCell (pTAG) and one or more TA groups not containing the SCell (sTAG).

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 2, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e., uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems. In TDD this has the additional circumstance that the transmission and reception occur on the same carrier frequency, i.e., downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advance problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 5 illustrates the Table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 6 shows the frame structure type 2, particularly for a 5 ms switch-point periodicity, i.e., for TDD configurations 0, 1, 2 and 6. FIG. 6 illustrates a radio frame, being 10 ms in length, and the corresponding two half-frames of 5 ms each. The radio frame consists of 10 subframes with each 1 ms, where each of the subframes is assigned the type of uplink, downlink or special, as defined by one of the Uplink-downlink configurations according to the table of FIG. 5.

As can be appreciated from FIG. 5, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as a multiple of the sample time $T_s=(1/30720)$ ms as defined for 3GPP LTE Release 11.

TABLE special subframe configurations, Frame Structure Type 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e., which subframe to monitor for measurement, for CSI measure and report, for time domain filtering to get channel estimation, for PDCCH detection, or for UL/DL ACK/NACK feedback.

LTE on Unlicensed Bands—Licensed-Assisted Access (LAA)

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum i.e., without being assisted by licensed cells, however shall not be excluded.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 7, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed that the LAA will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which partly may depend on the geographical region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1#78bis, September 2014 incorporated herein by reference as well as the 3GPP Technical Report 36.889, current version 13.0.0. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

For example, in Europe certain limits for the Nominal Channel Bandwidth is set, as apparent from section 4.3 of the European standard ETSI EN 301 893, current version 1.8.1, incorporated herein by reference. The Nominal Channel Bandwidth is the widest band of frequencies, inclusive of guard bands, assigned to a single channel. The Occupied Channel Bandwidth is the bandwidth containing 99% of the power of the signal. A device is permitted to operate in one or more adjacent or non-adjacent channels simultaneously.

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations at the moment mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In unlicensed spectrum, channel availability cannot always be guaranteed. In addition, certain regions such as Europe and Japan prohibit continuous transmissions and impose limits on the maximum duration of a transmission burst in the unlicensed spectrum. Hence, discontinuous transmission with limited maximum transmission duration is a required functionality for LAA. DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5-GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.0, incorporated herein by reference.

Following this European regulation regarding LBT, devices have to perform a clear channel Assessment (CCA) before occupying the radio channel with a data transmission. It is only allowed to initiate a transmission on the unlicensed channel after detecting the channel as free based e.g., on energy detection. In particular, the equipment has to observe the channel for a certain minimum time (e.g., for Europe 20 μs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

In addition to the CCA described above, it might be required to apply an additional extended CCA (ECCA) if the equipment is classified as Load Based Equipment (LBE) according to the description in ETSI 301 893, clause 4.9.2.2, incorporated herein by reference. The ECCA comprises an additional CCA observation time for the duration of a random factor N multiplied by a CCA observation time slot. N defines the number of clear idle slots resulting in a total idle period that has to be observed before initiating a transmission.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 8, the figure being taken from ETSI EN 301 893 (there FIG. 2: "Example of timing for Frame Based Equipment").

FIG. 9 illustrates the timing between a Wi-Fi transmission and LAA UE transmissions on a particular frequency band (unlicensed cell). As can be seen from FIG. 9, after the Wi-Fi burst, a CCA gap is at least necessary before the eNB "reserves" the unlicensed cell by e.g., transmitting a reservation signal until the next subframe boundary. Then, the actual LAA DL burst is started. This would similarly apply to an LTE UE which after successfully performing the CCA, would reserve the subframe by transmitting the reservation signal so as to then start the actual LAA UL burst.

As mentioned above, 3GPP is currently in the process of introducing LAA into the standard. Among many other things, it will be necessary to define how the UEs will be able to perform uplink transmissions while at the same time following the different regulatory requirements, particularly the CCA requirement.

BRIEF SUMMARY

Non-limiting and exemplary embodiments provide improved methods, user equipments, and radio base stations involved in scheduling uplink transmissions to be performed by the user equipments. The independent claims provide non-limiting and exemplary embodiments. Advantageous embodiments are subject to the dependent claims.

According to several implementations of the aspects described herein, the scheduling of uplink transmissions via unlicensed cells is improved. The following scenario is assumed in the following. The user equipment and a radio base station are connected to each other via at least one unlicensed cell in a mobile communication system. The unlicensed cell may be either operated as a standalone cell or may be assisted by a further licensed cell additionally configured between the user equipment and the radio base station.

Furthermore, it is assumed that the user equipment and the radio base station perform a suitable procedure so as to time align the uplink transmission timing that is followed by the user equipment. In particular, the user equipment needs to determine a particular point in time at which to perform an uplink transmission. This uplink transmission timing can be adjusted with a suitable procedure such that the uplink transmission is received at the radio base station at a particular desirable time, e.g., at basically the same time as uplink transmissions by other user equipments. For instance, the uplink transmission timing is determined by the user equipment based on the downlink reception timing and an additional timing advance as e.g., instructed by the radio base station. Put differently, the user equipment follows subframe boundaries which basically indicate at which time uplink transmission(s) shall be performed by the user equipment; i.e., normally the user equipment is to start with the uplink transmission at that subframe boundary of the subframe for which it was scheduled. By respectively instructing suitable timing advance values to be applied to the respective user equipments in its coverage area, the radio base station can thus ensure that the uplink transmissions performed by several user equipments in the coverage area of the radio base station are synchronized and coordinated in such a manner that the uplink transmissions are received at essentially the same time in the radio base station. As explained in the background section, a suitable procedure for aligning the uplink transmission timing is the timing advance procedure described therein in connection with the LTE standardization.

The scheduling of uplink (and downlink) transmissions is assumed to be under control of the radio base station, and the corresponding resource allocation(s) are communicated to the user equipment(s) in the station's coverage area of the unlicensed cell in a suitable manner. The following explanation focuses on the scheduling of uplink transmissions to be performed by user equipments via unlicensed cells. In general, before performing a transmission via the unlicensed cell, the radio base station as well as the user equipments have to first perform a "Listen-Before-Talk procedure" (including a clear-channel assessment) which is basically a procedure to make sure that the channel is not occupied by another transmission before actually starting the uplink/ downlink transmission. For instance, communication nodes, not under control of the radio base station (e.g., Wi-Fi nodes), may also want to access the unlicensed band. By use of the Listen-Before-Talk procedure fair usage of the unlicensed band between different radio technologies is provided. However, by mandating the use of the Listen-Before-Talk procedure for transmissions on the unlicensed band, the user equipments need to successfully finish the CCA determination; otherwise, they would not be able to perform the uplink transmission scheduled by the radio base station. In addition, also other nodes, such as Wi-Fi nodes, need to perform such a clear channel assessment before using the unlicensed cell. Consequently, for a proper functioning it is important to allow for sufficient time to successfully perform the CCA determination. According to an aspect, the possibility of additionally applying a time offset to an uplink burst transmission via an unlicensed cell is introduced as will be explained in the following in detail. More specifically, each user equipment has a particular timing for performing uplink transmissions via unlicensed and licensed cells, as assumed above e.g., which is controlled by the radio base station by use of a suitable procedure. According to an aspect, the uplink transmission timing at the user equipments can be additionally changed so as to create a time gap between two directly-subsequent uplink transmissions performed by different user equipments. The created time gap after a first uplink burst transmission is usable by a user equipment for successfully performing the clear-channel assessment, before starting its (second) uplink burst transmission.

For instance, assuming that the radio base station schedules various subsequent uplink transmissions, respectively one to a different user equipment, a sufficient gap needs to be provided between each of two subsequent uplink transmissions so as to ensure that each of the scheduled user equipments (and not only the first) is able to determine the channel as clear before its own uplink transmission is to start. Correspondingly, the shifting of the transmission timing(s) is coordinated among the various user equipments to create the appropriate time gaps with no transmissions within which the user equipment will detect the channel as not being occupied.

This will now be explained in a different manner. The additional shifting of the uplink transmission timing can be seen as an additional type of uplink transmission compared to the usual uplink transmission which is time-aligned with the subframe boundaries, i.e., aligned/synchronized with respect to the reception timing (or subframe boundaries) at the radio base station (as the receiving entity of the uplink transmission). Thus, an additional type of uplink transmission is introduced by the aspect, namely one for which the start of the uplink transmission is shifted by an amount of time in either direction with respect to the subframe boundaries, i.e., with respect to the normal uplink transmission timing which the user equipment would normally follow (e.g., for transmitting an uplink transmission via a licensed cell). In other words, the additional shifting of the uplink transmission according to this additional uplink transmission type, introduced by the aspect, is made on top of any timing advance generally performed by the user equipment, e.g., instructed by the radio base station and depending on the location of the user equipment with respect to the radio base station.

As mentioned before, by appropriately shifting the start of the uplink transmission a time gap is created between two directly subsequent uplink transmissions. For instance, when the start of the uplink transmission is postponed (i.e., delayed in time), a time gap is created in front of the postponed uplink transmission during which the UE can successfully perform the CCA determination before starting said postponed uplink transmission. On the other hand, when the start of the uplink transmission is preponed (i.e., advanced in time), the time gap is created after the preponed uplink transmission, and that UE that is subsequently scheduled to perform an uplink transmission immediately after the shifted uplink transmission may successfully finish the CCA determination during set time gap before starting said uplink transmission.

Consequently, it is possible for the radio base station to schedule two subsequent uplink transmissions to different user equipments while allowing at the same time that both user equipments successfully perform the clear-channel assessment and thus detect the unlicensed channel as free before starting the uplink transmission.

According to further improvements of the aspect, additional changes can be implemented for the uplink transmissions performed by the user equipments via unlicensed cells so as to improve and make the creation of time gap for CCA more flexible. In particular, the (shifted or not shifted) uplink transmission can be shortened by one or several OFDM symbols (for LTE implementations may also be termed in the following SC-FDMA symbols in view of the uplink technology SC-FMDA is used in the uplink). For example, a normal uplink transmission will at least span all OFDM symbols of one or more subframes, and it is now suggested to shorten this uplink transmission either at the beginning or the end of the uplink transmission, with the effect that the user equipment does not transmit during that OFDM symbol (s) and thus does not occupy the unlicensed cell during that period of time. One possibility to shorten the uplink transmission length is to puncture OFDM symbol(s), which can also be termed muting or nulling as the transmission is transmitted with 0 power during this time. By shortening an uplink transmission, it is possible to create a time gap either in front of the uplink transmission or behind the uplink transmission, the time gap being usable for a clear channel assessment performed either by that user equipment performing the shortened uplink transmission or another user equipment.

Put differently, the additional mechanism of shortening an uplink transmission can be equally regarded as introducing another type of uplink transmission, in addition to those two types of uplink transmissions as introduced before, i.e., the normal uplink transmission type spanning a complete subframe duration and being time aligned with the subframe boundaries followed by the user equipment, and the additional uplink transmission type also spanning a complete subframe duration but being additionally offset with respect to the subframe boundaries followed by the user equipment. In particular, a further type of uplink transmission would have the characteristic of being shortened (e.g., so as to not span a complete subframe duration) but would be still time aligned with the subframe boundaries such that the corresponding uplink transmission would either start at a subframe boundary or end at a subframe boundary (depending on which OFDM symbol(s) are discarded). A still further type of uplink transmission would be shortened (e.g., so as to not span a complete subframe duration) and would in addition be offset with respect to the subframe boundaries followed by the user equipment.

The above discussed mechanisms of additionally shifting the uplink transmission timing and of shortening the uplink transmission duration (and analogically the different uplink transmission types) can be used and coordinated in a suitable manner so as to create a sufficient time gap between subsequent uplink transmissions via the unlicensed cell to allow UE(s) to successfully perform a clear channel assessment while at the same time avoiding that unnecessary OFDM symbols are discarded (due to the shortening).

Each uplink transmission can be performed according to one of the four types as discussed above, such that the necessary CCA gap is created. Which uplink transmission will be performed according to which uplink transmission type will also depend on the actual uplink transmission sequence that is scheduled to different UEs by the radio base station via the unlicensed cell. For instance, for a sequence of only two subsequent uplink transmissions, i.e., before and after these two subsequent uplink transmissions the unlicensed cell is not used for transmission, a shortening of the uplink transmission (e.g., by a 1 OFDM symbol) is not necessary, and the first transmission can be performed by one UE without any shortening or additional time offset, while the second uplink transmission can be postponed by the second UE by an amount of time which is sufficient for the second UE to successfully perform the clear channel assessment.

An exemplary time offset which allows for sufficient time to successfully perform a clear channel assessment is half the duration of an OFDM symbol. However, the time offset may also be less or more, as long as the time gap that is created by offsetting the uplink transmission timing is long enough for a successful clear channel assessment. The amount of time to offset the uplink transmission can be for example indicated by the radio base station to the user equipments. It may be the same for all user equipments under control of the radio base station. Also, the amount of time for the offset can be changed semi-statically by the radio base station. Alternatively, the amount of time can be fixed, e.g., in the standard.

Further implementations of the aspect relate to how the UE determines how to perform an uplink transmission, i.e., with/without additional time shift and with/without shortening the uplink transmission. According to one implementation, the necessary information is provided by the radio base station to the user equipment, e.g., as part of the usual resource allocation. According to another implementation, a type pattern is provided in the UE and the radio base station which defines how to perform an uplink transmission at a particular subframe, such that any UE will determine the type of uplink transmission to perform based on the subframe for which the uplink transmission is scheduled and on the pattern.

Correspondingly, in one general first aspect, the techniques disclosed here feature a radio base station for scheduling uplink transmissions for a user equipment. At least one unlicensed cell is configured for communication between the user equipment and the radio base station. The at least one user equipment can perform an uplink transmission via the unlicensed cell according to at least the following different types of uplink transmissions:
   a first type of uplink transmission (Type A) which spans a complete subframe duration and starts and ends at subframe boundaries followed by the user equipment, and at least one of:
      a second type of uplink transmission (Type B) which spans a complete subframe duration, the uplink transmission being offset by a predetermined amount of time with respect to subframe boundaries followed by the user equipment such that the uplink transmission of the second type starts before/after a first subframe boundary and ends after/before a second subframe boundary being subsequent to the first subframe boundary, and
      a third type of uplink transmission (Type C) which spans less than a complete subframe duration, the uplink transmission being offset by a predetermined amount of time with respect to subframe boundaries followed by the user equipment.

The radio base station comprises a processor and transmitter, which, in operation, schedule uplink transmissions via the unlicensed cell to the at least one user equipment. Furthermore, the radio base station comprises a receiver, which, in operation, receives the scheduled uplink transmissions from the at least one user equipment. Each of the scheduled uplink transmissions is performed by the at least one user equipment according to one of the different types of uplink transmissions in such a manner that at least between two directly-subsequent uplink transmissions a time gap with no uplink transmission occurs.

Correspondingly, in one general first aspect, the techniques disclosed here feature a user equipment for performing uplink transmissions, scheduled by a radio base station. At least one unlicensed cell is configured for communication between the user equipment and the radio base station. The user equipment can perform an uplink transmission via the unlicensed cell according to at least the following different types of uplink transmissions:
   a first type of uplink transmission (Type A) which spans a complete subframe duration and starts and ends at subframe boundaries followed by the user equipment, and at least one of:
      a second type of uplink transmission (Type B) which spans a complete subframe duration, the uplink transmission being offset by a predetermined amount of time with respect to subframe boundaries followed by the user equipment such that the uplink transmission of the second type starts before/after a first subframe boundary and ends after/before a second subframe boundary being subsequent to the first subframe boundary, and
      a third type of uplink transmission (Type C) which spans less than a complete subframe duration, the uplink transmission being offset by a predetermined amount of time with respect to subframe boundaries followed by the user equipment.

The user equipment comprises a processor, which in operation, determines one of the types of uplink transmission for a scheduled uplink transmission. Furthermore, the user equipment comprises a transmitter, which in operation, performs the uplink transmission according to the determined type via the unlicensed cell.

Correspondingly, in one general first aspect, the techniques disclosed here feature a system comprising at least one user equipment and a radio base station. At least one unlicensed cell is configured for communication between the at least one user equipment and the radio base station. The at least one user equipment can perform an uplink transmission via the unlicensed cell according to at least the following different types of uplink transmissions:
   a first type of uplink transmission (Type A) which spans a complete subframe duration and starts and ends at subframe boundaries followed by the user equipment, and at least one of:
      a second type of uplink transmission (Type B) which spans a complete subframe duration, the uplink transmission being offset by a predetermined amount of time with respect to subframe boundaries followed by the user equipment such that the uplink transmission of the second type starts before/after a first subframe boundary and ends after/before a second subframe boundary being subsequent to the first subframe boundary, and a third type of uplink transmission (Type C) which spans less than a complete subframe duration, the uplink transmission being offset by a predetermined amount of time with respect to subframe boundaries followed by the user equipment.

The radio base station comprises a processor and transmitter, which, in operation, schedule uplink transmissions via the unlicensed cell to the at least one user equipment. The user equipment comprises a receiver, which in operation, receives a resource assignment from the radio base station scheduling an uplink transmission. The user equipment comprise a processor, which in operation, determines one of the types of uplink transmission for the scheduled uplink transmission. The user equipment comprises a transmitter, which in operation, performs the uplink transmission according to the determined type via the unlicensed cell. The radio base station comprises a receiver, which in operation, receives the scheduled uplink transmissions. Each of the scheduled uplink transmissions is performed by the at least one user equipment according to one of the different types of uplink transmissions in such a manner that at least between two directly-subsequent uplink transmissions a time gap with no uplink transmission occurs.

Correspondingly, in one general first aspect, the techniques disclosed here feature a method for operating a user equipment for performing uplink transmissions, scheduled by a radio base station. At least one unlicensed cell is configured for communication between the user equipment and the radio base station. The user equipment can perform an uplink transmission via the unlicensed cell according to at least the following different types of uplink transmissions:

a first type of uplink transmission (Type A) which spans a complete subframe duration and starts and ends at subframe boundaries followed by the user equipment, and at least one of:

a second type of uplink transmission (Type B) which spans a complete subframe duration, the uplink transmission being offset by a predetermined amount of time with respect to subframe boundaries followed by the user equipment such that the uplink transmission of the second type starts before/after a first subframe boundary and ends after/before a second subframe boundary being subsequent to the first subframe boundary, and a third type of uplink transmission (Type C) which spans less than a complete subframe duration, the uplink transmission being offset by a predetermined amount of time with respect to subframe boundaries followed by the user equipment.

The method comprises the following steps performed by the user equipment:

determining one of the types of uplink transmission for a scheduled uplink transmission, and performing the uplink transmission according to the determined type via the unlicensed cell.

Correspondingly, in one general first aspect, the techniques disclosed here feature a method for operating a radio base station for scheduling uplink transmissions for a user equipment. At least one unlicensed cell is configured for communication between the user equipment and the radio base station. The at least one user equipment can perform an uplink transmission via the unlicensed cell according to at least the following different types of uplink transmissions:

a first type of uplink transmission (Type A) which spans a complete subframe duration and starts and ends at subframe boundaries followed by the user equipment, and at least one of:

a second type of uplink transmission (Type B) which spans a complete subframe duration, the uplink transmission being offset by a predetermined amount of time with respect to subframe boundaries followed by the user equipment such that the uplink transmission of the second type starts before/after a first subframe boundary and ends after/before a second subframe boundary being subsequent to the first subframe boundary, and a third type of uplink transmission (Type C) which spans less than a complete subframe duration, the uplink transmission being offset by a predetermined amount of time with respect to subframe boundaries followed by the user equipment.

The method comprises the following steps performed by the radio base station:

scheduling uplink transmissions via the unlicensed cell to the at least one user equipment, receiving the scheduled uplink transmissions from the at least one user equipment.

Each of the scheduled uplink transmissions is performed by the at least one user equipment according to one of the different types of uplink transmissions in such a manner that at least between two directly-subsequent uplink transmissions a time gap with no uplink transmission occurs.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIGS. 17-24 illustrate different sequences of uplink transmissions according to different types, according to exemplary implementations of the first embodiment, and FIG. 25 illustrates possible type patterns applicable to TDD uplink downlink configurations 0, 1 and 2 according to exemplary implementations of the first embodiment.

DETAILED DESCRIPTION

Figure 1:
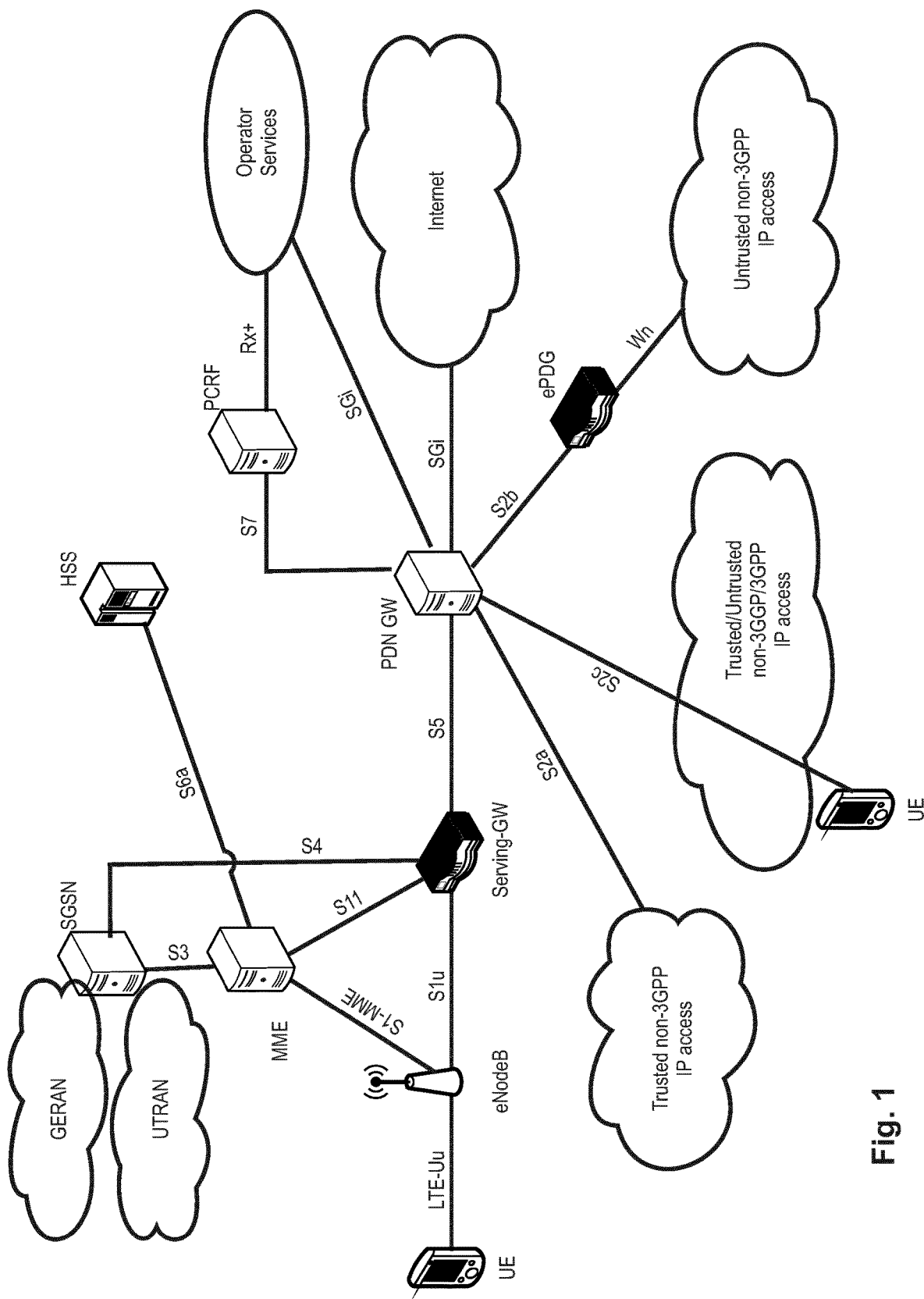
FIG. 1 shows an exemplary architecture of a 3GPP LTE system.
Figure 2:
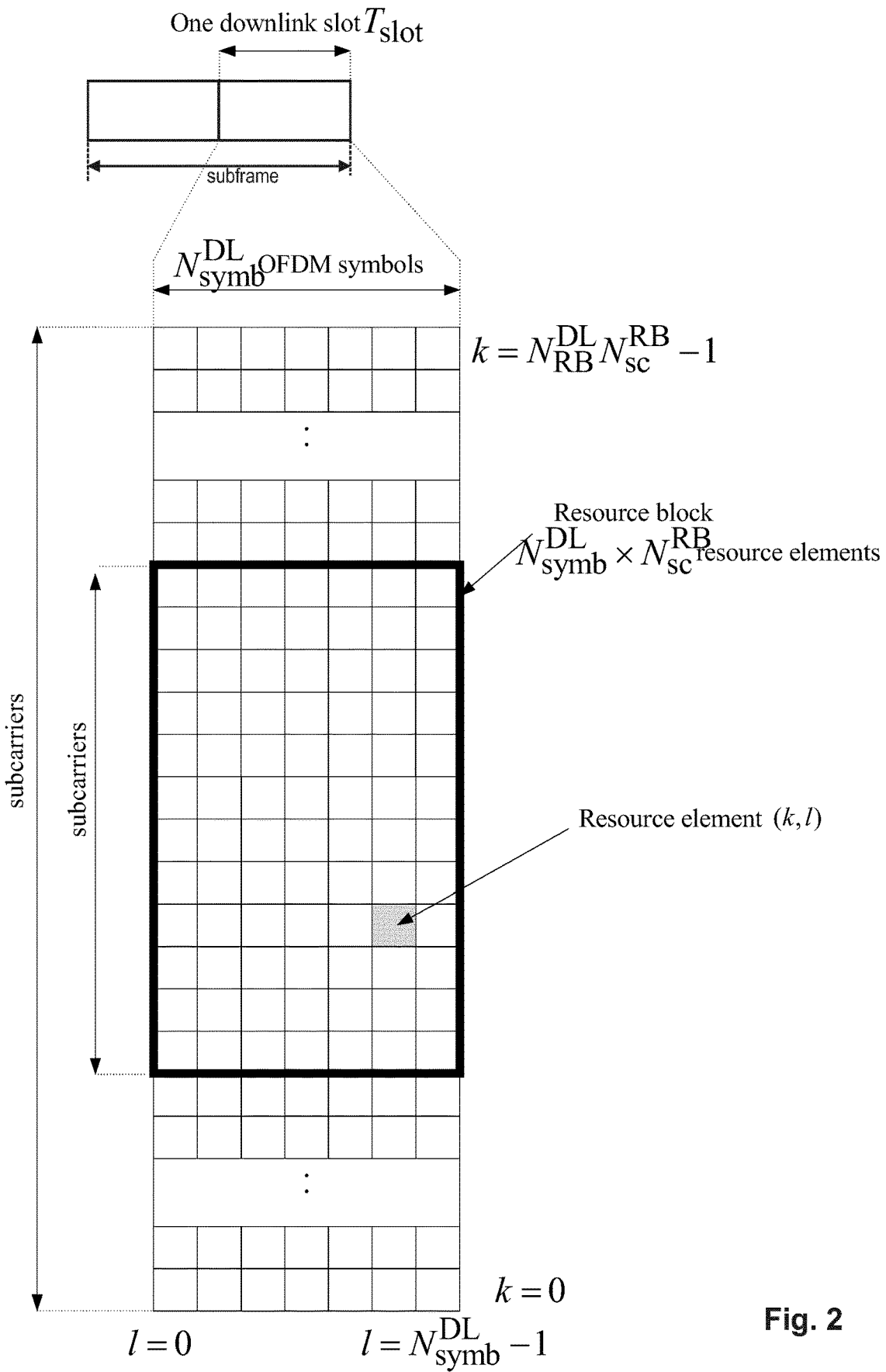
FIG. 2 shows an exemplary downlink resource grid of a downlink slot of a subframe as defined for 3GPP LTE (Release 8/9)
Figure 3:
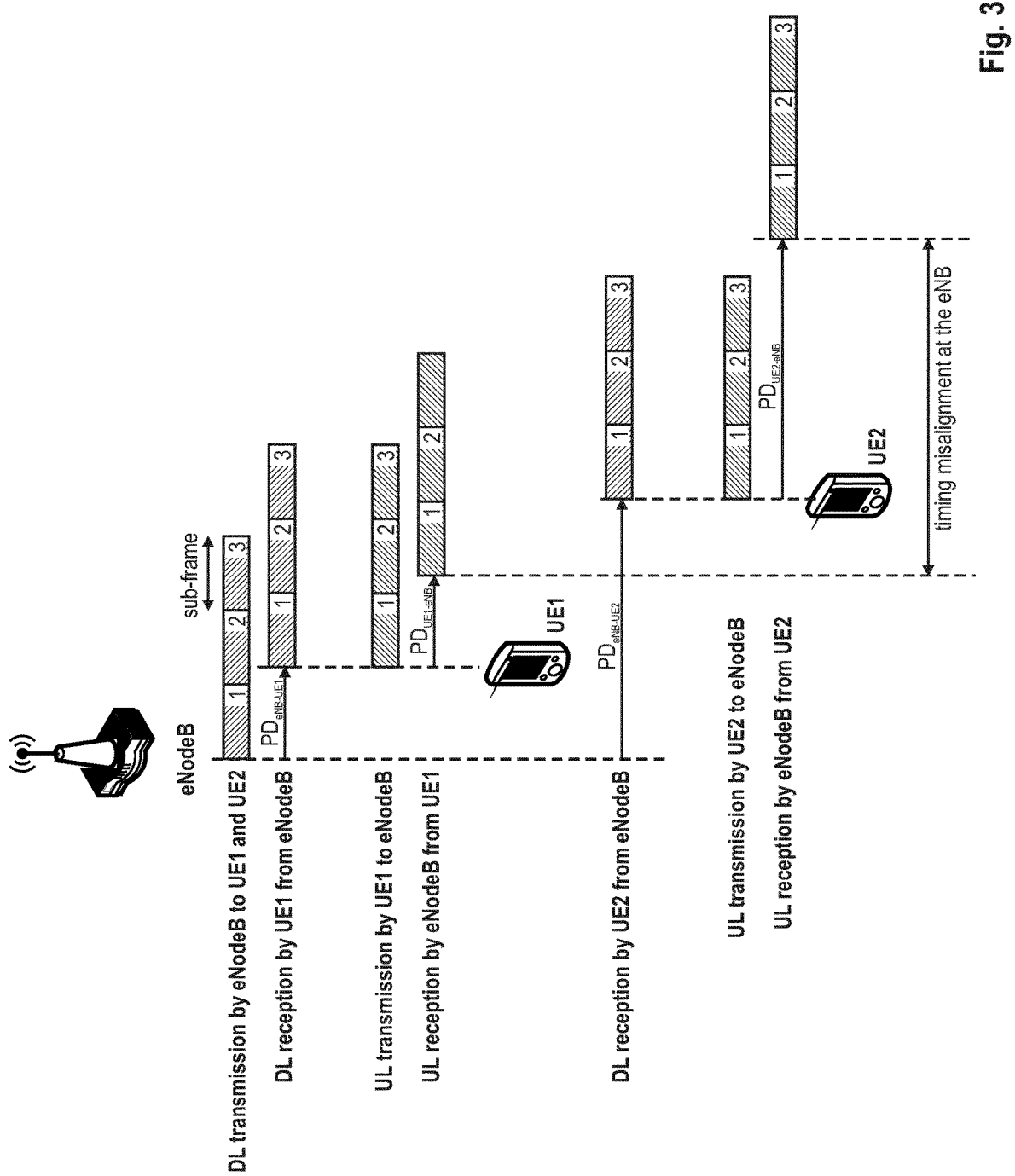
FIG. 3 illustrates the timing misalignment of uplink transmissions from two mobile terminals as received in the eNodeB, when no uplink timing alignment is performed.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier operated in an unlicensed frequency band, with a particular frequency bandwidth. Correspondingly, the term "licensed cell" or alternatively "licensed carrier" as used in the set of claims and in the application is to be understood broadly as a cell/carrier operated in a licensed frequency band, with a particular frequency bandwidth. Exemplarily, these terms are to be understood in the context of 3GPP as of Release 12/13 and the Licensed-Assisted Access Work Item.

The expression "type of uplink transmission" as used in the set of claims in the application is conceptually introduced so as to be able to differentiate between uplink transmissions that differ from one another by applying either one, none or both of the 2 mechanisms discussed in connection with the first embodiment, i.e., the mechanism of additionally introducing a time of set for the uplink transmission via an unlicensed cell and the mechanism of shortening the length of an uplink transmission via an unlicensed cell.

The expression "with respect to the subframe boundaries followed by the user equipment" shall indicate that the shifting is performed vis-à-vis the "normal" transmission timing that the UE would have normally followed and which is embodied by the concept of subframe boundaries that are followed by the UE(s) (e.g., which the UE follows for performing uplink transmissions via the licensed cell). In other words, the subframe boundaries defined for a user equipment basically indicate a usually-employed timing in the UE for e.g., starting an uplink transmission.

As explained in the background section, 3GPP is currently in the process of introducing the licensed-assisted access (LAA). Although some agreements have been achieved already for LAA, no agreements could yet be achieved for some important issues in said respect. For instance, up to now the focus was put on reaching agreements regarding the downlink LAA. On the other hand, no significant decisions were so far reached on how to handle UE behavior for the uplink LAA particularly for the uplink transmission. It should be noted that part of the current UE behavior appears to not be applicable in the same manner to operation on unlicensed bands/cells as will become apparent from below.

Regarding the timing advance in case of LAA operation in unlicensed bands at 5 GHz, it can be assumed that the coverage area of such a cell will be rather limited e.g., due to transmit power restrictions inflicted on the unlicensed band operation by regulatory requirements as explained in the background section. It can therefore be expected that a typical maximum coverage area radius of such a small cell will be between 100 to 200 m. Taking into account that the TA granularity of 0.52 µs corresponds to the propagation delay caused by the distance of 156 m between eNB and UE, it is reasonable to assume the same small TA value (e.g., 0 or 1) (almost) for all UEs associated to that unlicensed cell.

On the other hand, basically the same situation however may also occur in case unlicensed cells cover larger areas. Particularly, UEs that are closely located to each other will also be instructed to apply the same or a very similar TA value. In other words, although different timing advance values may be applied by different UEs (e.g., by UEs being located at large distances from each other), there will still be UEs that will have a very similar uplink transmission timing.

It is further assumed that LTE uplink transmissions in unlicensed bands will be scheduled by the eNB, e.g., as explained in the background section. Correspondingly, downlink control information (DCI) with the resource allocation for the uplink transmission will be transmitted from the eNB to the UE in a physical downlink control channel (PDCCH) or in an enhanced physical downlink control channel (EPDCCH) either in the associated licensed PCell (cross-carrier scheduling) or on the unlicensed PCell itself in terms of self-scheduling of the unlicensed cell.

The details of LBT behavior for LAA uplink transmissions are still under discussion at 3GPP. It is so far not clear whether it will be required or not; and if it will be mandatory, it is furthermore not clear whether it has to incorporate just a fixed duration CCA (such as for example 20 µs according to the current minimum requirement for Europe, see ETSI 301 893, under clause 4.8.3), or an additional ECCA as well.

The embodiments presented in this document are particularly advantageous in case that each uplink transmission in the unlicensed band requires a clear channel assessment (CCA) prior to the respective transmission in order to support fair channel access in coexistence with other equipment (such as Wi-Fi nodes) that are operating on the same unlicensed channel.

Figure 10:
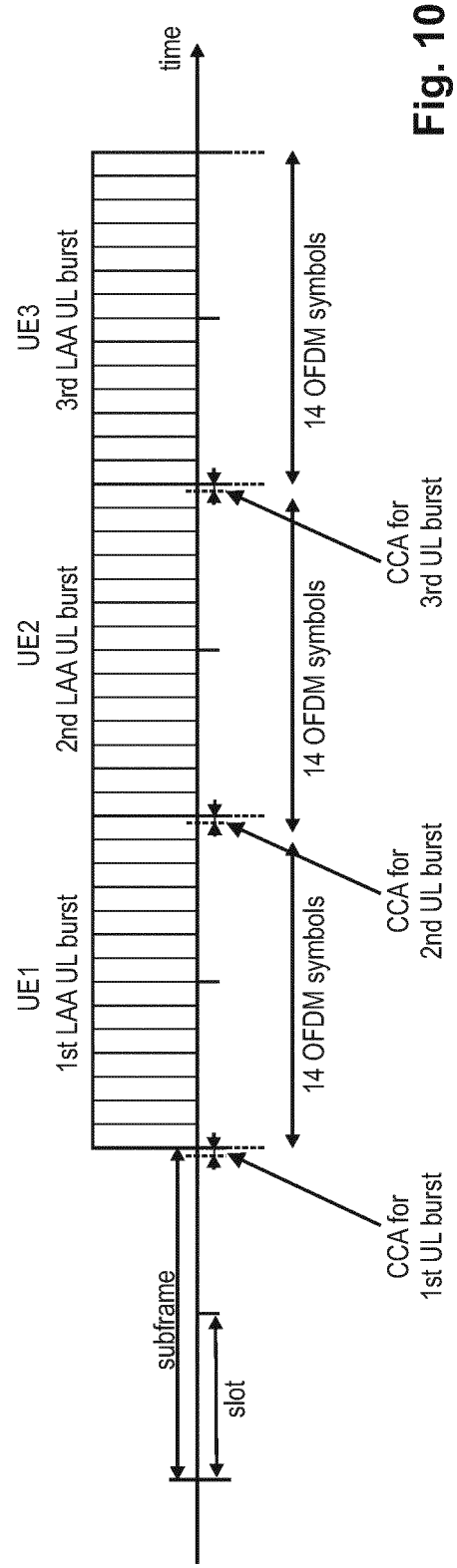
FIG. 10 illustrates a sequence of three subsequent uplink transmissions performed by the 3 different UEs by an unlicensed cell.

FIG. 10 illustrates three directly-subsequent uplink transmissions by three different UEs (UE1, UE2, and UE3), each uplink transmission exemplarily spanning a subframe duration. The uplink transmission reference timing to be followed by the user equipment is indicated in the figure by use of the depicted subframe boundaries. In other words, the subframe boundaries as illustrated in FIG. 10 shall be assumed to be the points in time when the user equipment should start a uplink transmission scheduled by the eNodeB for said subframe.

As apparent therefrom, since the respective uplink transmissions cover the complete subframe, there is a problem in that UE2 (and UE3) would not be able to perform the illustrated uplink transmission if they have to first perform CCA (which is currently foreseen to be a mandatory measure for unlicensed bands in many countries). The CCA, which would be performed by UE2 and UE3, right before the (possible) start of the respective uplink transmissions, would not be successful due to the transmission happening at that time, i.e., the uplink transmission by UE1, respectively the hypothetical uplink transmission by UE2. Therefore, for the particular sequence of uplink transmissions for the three UEs when considering that the CCA is mandatory, UE2 would not have been able to perform the uplink transmission do to the failed CCA, and in turn the CCA performed by UE3 would be successful due to the second uplink transmission not having started before (it does not occupy the unlicensed cell). Such a situation is disadvantageous since subsequent uplink transmissions by different UEs would not be possible due to the CCA not being successful; e.g., the first and second uplink transmission in the example illustrated in FIG. 10. At most, only every second subframe would be usable On the other hand, in case CCA is not mandatory before an uplink transmission on the unlicensed cell, the LTE nodes may be continuously occupying the unlicensed cell. Thus, Wi-Fi nodes will not be able to access the unlicensed cell due to the continuous occupancy of the unlicensed cell by the LLA nodes.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various implementations of the presented embodiment. It should be noted that the embodiment may be advantageously used for example in a mobile communication system, such as 3GPP LTE-A (Release 10/11/12/13 and later) communication systems as described in the Technical Background section above, but the embodiments are not limited to its use in these particular exemplary communication networks. The explanations should not be understood as limiting the scope of the disclosure, but as a mere example of embodiments to better understand the present disclosure. A skilled person is aware that the general principles of the present disclosure as generally outlined in the set of claims and in the explanations given in the summary section of the description can be applied to different scenarios and in ways that are not explicitly described in the following. For illustration and explanation purposes, several assumptions are made which however shall not unduly restrict the scope of the following embodiments.

Furthermore, as mentioned above, the following embodiments may be implemented in the 3GPP LTE-A (Rel.12/13 and later) environment. The various embodiments mainly allow for having an improved uplink transmission scheme. Other functionality (i.e., functionality not changed by the various embodiments) however may remain exactly the same as explained in the background section or may be changed without any consequences to the various embodiments; for instance functions and procedures defining how the uplink transmission is actually performed (e.g., segmentation, modulation, coding, beamforming, multiplexing) and scheduled (PDCCH, DCI, cross carrier scheduling, self scheduling) or how the usual uplink transmission timing by using the timing advance procedure is performed (e.g., initial timing advance, timing advance update commands).

In the following, an embodiment is described for solving the above problem(s).

First Embodiment

In the following, a first embodiment for solving the above problem(s) will be described in detail, which will be explained by using the following exemplary scenario, devised to easily explain the principles of the embodiment. The principles however can also be applied to other scenarios, some of which will be explicitly mentioned in the following.

As explained in the background section, 3GPP is planning to enhance current systems by introducing LAA, licensed-assisted access, including the use of unlicensed cells being operated on channel(s) in the unlicensed frequency spectrum. In the following, a scenario is assumed where the UE is configured with at least one unlicensed cell and optionally with at least one further licensed cell. Several UEs are communicating with the eNB via the unlicensed cell. Although the following explanations are based on such a scenario, the different embodiments also apply to scenarios where the unlicensed cell is operated in a standalone manner (i.e., without being assisted by a corresponding licensed cell).

The unlicensed cell can be configured between the eNodeB and the UE in the usual manner as described in the background section. Accordingly, the unlicensed cell is operated on a particular channel in the unlicensed frequency spectrum. As explained in detail in the background section, operation on the unlicensed cell is regulated in many ways, e.g., in Europe according to the European standard ETSI 301 893. Among many things, for European (and also for other regions) the Listen-Before-Talk and the corresponding clear-channel Assessment is currently foreseen to be mandatory for eNBs and UEs before performing transmissions via the unlicensed cell so as to ensure fair coexistence and channel access between Wi-Fi and LTE LAA. Further details on how to perform LBT and CCA are omitted here and instead reference is made to the corresponding passages of the background section describing an exemplary LTE implementation.

It is further assumed that uplink transmissions, to be performed by UEs to the eNB, are scheduled by the eNB in a suitable manner, e.g., in the usual manner as explained in the background section for an LTE implementation. Accordingly, uplink transmissions via the unlicensed cell can be scheduled by transmitting a (E)PDCCH with a DCI either in the associated PCell (cross-carrier scheduling) or in the unlicensed cell (self-scheduling). Further details on the control signaling transmitted to schedule uplink transmissions is omitted at this point, and instead reference is made to the corresponding passages of the background section describing an exemplary LTE implementation.

The scenario further assumes that the UEs have an uplink reference timing according to which they perform the uplink transmissions, i.e., according to which they start the uplink transmission. For instance, each of the UEs determines its uplink reference timing relative to the downlink reception timing by additionally applying a timing advance parameter instructed by the eNB, so as to compensate for the different propagation delays between different user equipments. Assuming that the LAA scenario will mainly apply to small cells with a very limited coverage area, no (or only a very small) timing advance might have to be applied by the UEs for transmissions via the unlicensed cell, since the propagation differences are negligible. It should be noted however that this latter assumption is only a possible exemplary implementation (particularly in case LAA is applied for small cells) and that the principles described in the following are equally applicable to cases where each of the UEs applies a respective (possibly different) timing advance for performing the usual uplink transmissions (e.g., via the licensed cell). A possible procedure for aligning the uplink transmission timing appropriately is the timing advance procedure as described in the background section for LTE implementations; details in said respect are omitted at this point, and instead reference is made to the corresponding passages in the background section. In the following, this normal uplink reference timing can also be described as being given/defined by the subframe boundaries (also for ease of illustration in the figures) which are followed by the user equipment, meaning that the subframe boundaries are to be used by user equipments as the points in time to start an uplink transmission, as explained and illustrated in FIG. 10.

A further assumption made in the following is that a normal cyclic prefix is used in the various scenarios with the result that the corresponding uplink subframes comprise 14 OFDM symbols (may also be termed SC-FDMA symbols, in view of that LTE uses SC-FDMA in the uplink). On the other hand, the principles of the first embodiment are equally applicable when using an extended cyclic prefix and thus for a scenario where the uplink subframes comprise 12 OFDM symbols (may also be termed SC-FDMA symbols, in view of that LTE uses SC-FDMA in the uplink).

Figure 11:
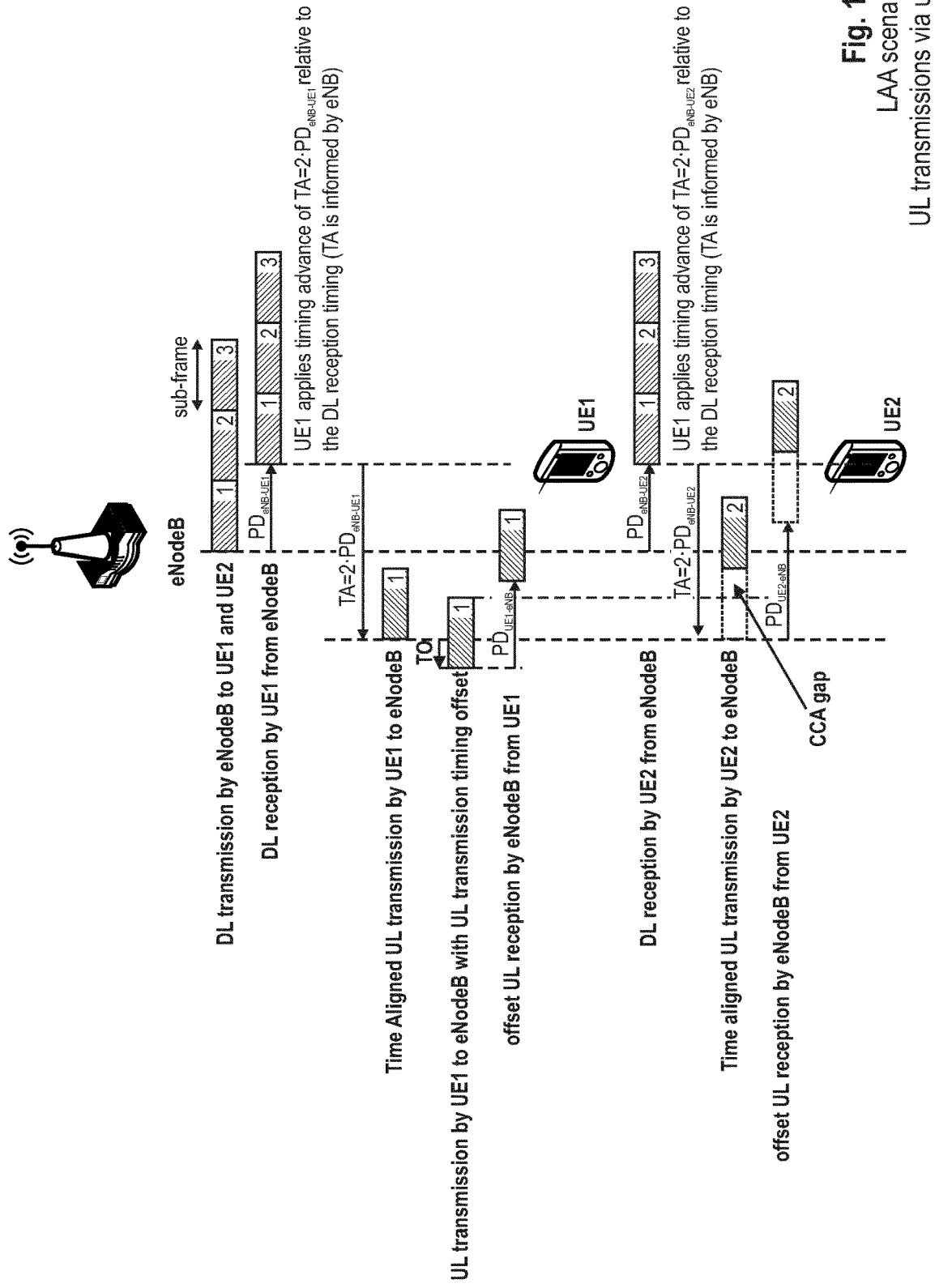
FIG. 11 illustrates the different downlink and uplink timings for transmissions exchanged between the eNodeB and UE1 and UE2 with uplink time alignment, additionally implementing the mechanism of an additional uplink transmission timing offset for UE1 according to an exemplary implementation of the first embodiment.

According to this first embodiment, an additional mechanism is implemented which allows to additionally offset the uplink transmission timing of particular uplink transmissions to be performed by a user equipment via the unlicensed cell with the aim to create a time gap (also termed in the following and the figures "CCA gap") between two uplink transmissions during which no transmission is taking place and the UE will have sufficient time to successfully perform a CCA. This additional mechanism will be explained exemplarily in connection with FIG. 11, which is a similar figure as FIG. 4 used for explaining the timing advance in the background section. It should be noted that FIG. 11 is only a conceptual drawing and the extensions and scales used therein are not accurate but serve to explain the first embodiment. For instance, for ease of illustration the time advance to be applied by the UEs is more than twice the length of a subframe, which however is not likely the case in real implementations and even less for implementations where the LAA unlicensed cell covers only a very limited area. As explained in the background section, realistic timing advance values for unlicensed small cells reach 1×0.52 us or 2×0.52 us, corresponding to a distance between eNB and UE of 78 m and 156 m, respectively since the timing advance equals two times the propagation delay between eNB and UE and the timing advance granularity is 0.52 us as described in the background section.

Figure 4:
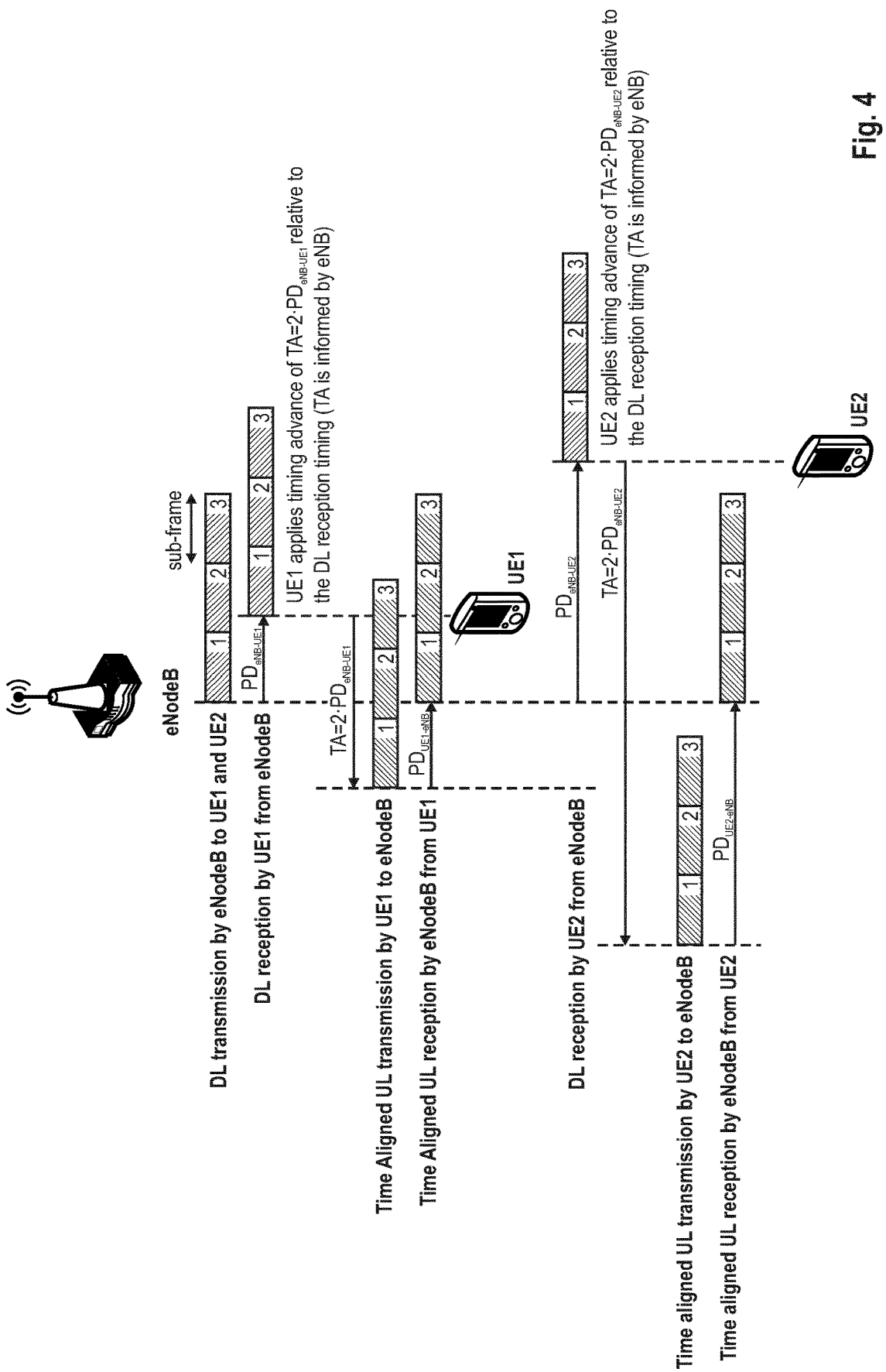
FIG. 4 illustrates the effect of performing uplink timing transmissions where the uplink timing alignment is synchronized for the uplink transmissions from two mobile terminals.

Correspondingly, FIG. 11 illustrates the uplink transmissions from two UEs to the same eNodeB via an unlicensed cell and the corresponding relative transmission and reception timings. In contrast to the scenario assumed for FIG. 4, FIG. 11 assumes an LAA scenario where the unlicensed cell has a very limited coverage area and consequently where the propagation delays are quite similar (assumed to be the same, but not 0, in the illustration of FIG. 11). Correspondingly, $PD_{eNB-UE1}$ and $PD_{eNB-UE2}$ are assumed to be the same as apparent from the downlink reception timing of the downlink transmission from the eNodeB at UE1 and UE2 and the resulting TA-extent applied by UE1 and UE2. For this scenario of FIG. 11 it is assumed that the eNodeB has scheduled UE1 for a first subframe and UE2 for the directly-subsequent subframe 2. As already explained in connection with FIG. 4 of the background section, the usual time advance procedure can be applied between the eNodeB and the respective UE1 and UE2, as illustrated in FIG. 11 (UE1: "Time Aligned UL transmission by UE1 to eNodeB"; UE2: "Time Aligned UL transmission by UE2 to eNodeB"). Correspondingly, UE1 would determine its uplink transmission timing based on the downlink reception timing and the timing advanced value, in the usual manner as illustrated in FIG. 4.

However, according to this first embodiment, it is further assumed that the uplink transmission to be performed by UE1 is additionally offset by a predetermined amount of time as also illustrated in FIG. 11 (see UE1: "UL transmission by UE1 to eNodeB with UL transmission timing offset," "TO"). In the particular example of FIG. 11, the uplink transmission timing of UE 1 is preponed (i.e., advanced in time) by the amount of time TO with respect to the normally-used uplink transmission timing. As a result, taking into account the propagation delay $PD_{UE1-eNB}$, the uplink transmission is correspondingly received in the eNodeB as well ahead of time by the amount of time TO.

A typical implementation for LAA would extend the uplink frame timing for LTE as described in 3GPP TS 36.211, clause 8.1 by an additional uplink transmission timing shift per UL burst within the UL radio frame. The current shift between DL and UL radio frame timing is given by (N_TA+N_TA_offset)×Ts. N_TA is the timing advance per UE as described in the background section, and N_TA_offset is an additional fixed offset that is 0 in case of FDD and 624 in case of TDD for all UEs. The enhanced shift based on the embodiment is then given by (N_TA+N_TA_offset+TO(i))×Ts, where TO(i) is the additional uplink timing offset for UL burst i in order to create the CCA gaps between consecutive LAA UL bursts according to the various implementations of the first embodiment.

By advancing the uplink transmission timing for the uplink transmission of UE1, a time gap of length TO is created between the end of this first uplink transmission and the start of the subsequent uplink transmission to be performed by UE2 as scheduled by the eNodeB (see "CCA gap" arrow in FIG. 11). In particular, for the uplink transmission of UE2, it is assumed that no additional offset is applied to the uplink transmission timing (since not necessary). Thus, UE2 determines the uplink transmission timing by use of the timing advance relative to the downlink reception reference timing in the usual manner. In the resulting CCA gap of length TO, the UE2 is able to successfully finish a CCA determination since UE2 will determine that the unlicensed cell is not (no longer) occupied by the transmission of UE1.

On the other hand, without the CCA gap created by the additional uplink transmission offset according to the first embodiment, the UE2, when performing the necessary CCA determination before starting its own uplink transmission as scheduled by the eNodeB, would determine that the unlicensed cell is occupied, namely by the transmission performed by UE1, and would thus not be allowed to perform its uplink transmission due to the failed CCA (see also FIG. 10).

Alternatively, although not illustrated in FIG. 11, the additional timing offset could also have been applied to the second uplink transmission performed by UE2, particularly postponing (i.e., delaying) the second uplink transmission by the time offset TO. In this case, the uplink transmission performed by UE 1 would not need to be offset since the necessary time gap for UE2 to perform the CCA would be already created by postponing the second uplink transmission.

Consequently, by selectively applying an additional time offset to the uplink transmission timing of particular scheduled uplink transmissions (while not applying this same time offset to other uplink transmissions), time gaps are created that are usable by UE(s) (and also Wi-Fi nodes) to perform CCA determinations.

The amount of the time offset shall be such that the created time gap is sufficient to finish a CCA determination. The minimum time for Wi-Fi to perform the clear channel assessment (termed DIFS, Distributed Inter-Frame Space) is 34 µs; the minimum time for an LTE UE to complete the clear channel assessment will at least be 20 µs following the current regulatory requirements in Europe. As described in the background section, the exact CCA rules for LAA are still under discussion at 3GPP. For instance, for a normal cyclic prefix duration the time offset may be (about) half the length of an SC-FDMA symbol, i.e., 2192/2×Ts=35.6771 µs, which is sufficient for a UE to finish the CCA or for a Wi-Fi node to finish with the DIFS.

The amount of time for the additional uplink transmission offset is known to the UE(s) and eNodeB. For instance, a suitable indication can be provided by the eNodeB to the UE(s), e.g., during the establishment of the unlicensed cell using RRC signaling, and/or with the actual resource allocation transmitted from the eNodeB to the UE. Any other suitable means is also possible, such as a pre-configuration or a fixed indication in the standards or USIM card (Universal subscriber identity module).

Furthermore, the UE(s) have to know when it shall apply the additional offset to the uplink transmission, i.e., for which uplink transmission(s) and for which not. This can be achieved e.g., by a suitable indication from the eNodeB, e.g., transmitted together with the actual resource allocation scheduled from the eNodeB. According to one implementation of the first embodiment, one bit within the resource allocation may indicate to the UE whether or not to apply the additional timing offset for the scheduled uplink transmission. In said case, the amount of time would be already known to the user equipment, according to any one of the above discussed options. Alternatively, an uplink transmission pattern could be defined in the UE(s) and eNodeB indicating for each subframe of a radio frame whether (optionally also which time offset) should be applied by a UE that is scheduled by the eNodeB for that particular subframe. Consequently, a UE would determine, based on the uplink transmission pattern and the particular subframe for which it is scheduled, whether it has to additionally offset its uplink transmission timing or not.

Figure 12:
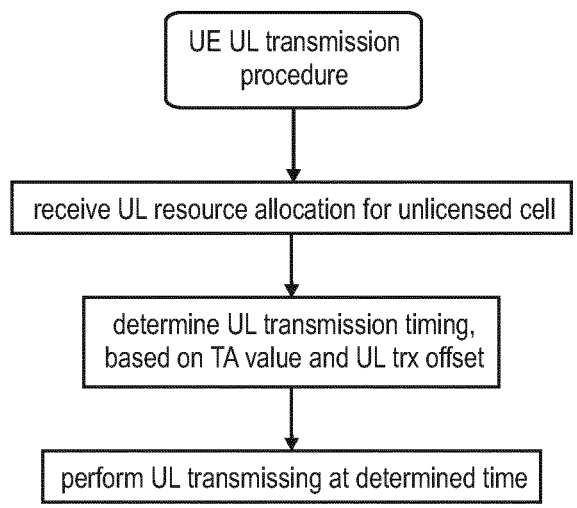
FIG. 12 is a diagram for an uplink transmission procedure according to an exemplary implementations of the first embodiment.

FIG. 12 illustrates a general diagram of the processing at the UE to be performed for an uplink transmission for an exemplary implementation of the first embodiment. The uplink transmission procedure as illustrated in FIG. 12 is heavily simplified, to focus on the gist as just explained for the first embodiment above. In particular, it is assumed that the UE receives a resource allocation to perform an uplink transmission via an unlicensed cell, and correspondingly the UE would have to determine a corresponding uplink transmission timing. As apparent from FIG. 12, the determination of the uplink transmission timing is based on the usual timing advance value as well as on the additional uplink transmission timing of said introduced by this first embodiment. Finally, the UE performs the uplink transmission at the time determined by the previous step.

Additional advantageous implementations of the first embodiment will be explained in the following. Further to applying an additional timing offset for the uplink transmission timing, a further mechanism may be used by which particular uplink transmissions may be shortened in their length as will be explained in the following. Usually, the eNodeB schedules an uplink transmission for at least the length of a subframe, i.e., occupying all OFDM (SC-FDMA) symbols in the subframe (i.e., 14 OFDM symbols for the normal cyclic prefix, or 12 OFDM symbols for an extended cyclic prefix). Now, according to further implementations of the first embodiment, the length of a particular uplink transmission may be shortened, e.g., such that it spans less than the complete subframe duration. In case the uplink transmission spans more than one subframe, the shortening is to apply to the last or first subframe thereof. This may be achieved for instance at the UE-side by puncturing one or more of the OFDM symbols of the uplink transmission. In other words, an uplink transport block is prepared by the user equipment for a scheduled uplink transmissions under the assumption of a full subframe allocation according to the procedure described in 3GPP TS 36.212, clause 5.2.2, incorporated herein by reference. The additional puncturing (nulling) of the first or last SC-FDMA (i.e., OFDM) symbol will be performed on top of the mapping to physical resources as described in 3GPP TS 36.211, clause 5.3.4, incorporated herein by reference. This is exemplarily illustrated in FIGS. 16a and 16b (more information with regard to "Type D" will be explained later). As apparent from FIGS. 16a and 16b, the first or last OFDM symbol may be punctured thereby shortening the uplink transmission burst length by the corresponding amount of time. Also more than one OFDM symbol may be punctured from the start or the end of the uplink transmission.

As will be appreciated, by shortening the uplink transmission length, a time gap, where no transmission is performed (i.e., the unlicensed cell is not occupied), is created in front or after the uplink transmission, which may be used to perform a necessary CCA. Thus, by appropriately shortening the uplink transmission length for particular uplink transmission(s) scheduled by the eNodeB to different UEs, each of UEs should have sufficient time to successfully perform the CCA (since unlicensed cell is not occupied) before starting its own (possibly shortened) uplink transmission. However, by puncturing the uplink transmission the redundancy of the encoded is reduced due to the punctured OFDM symbol, and the overall transmission in the subframe becomes less reliable. Consequently, using only the mechanism of shortening the uplink transmission length is disadvantageous. However, the mechanism of shortening the uplink transmission length may be combined with the above described mechanism of the additional time offset for the uplink transmission timing so as to achieve an advantageous embodiment as will be explained in the following.

These two mechanisms may be selectively applied to particular uplink transmissions of different UEs so as to create the necessary time gaps between subsequent uplink transmissions so as to allow the respective UEs to perform and finish the CCA successfully. When, which of the two mechanisms, and how these are to be applied by the UE(s) strongly depends on the particular uplink transmission sequence that is scheduled by an eNodeB as will become apparent from the following explanations.

In general, it is important for the UE(s) to know how a particular uplink transmission is to be performed via an unlicensed cell, i.e., which of the above introduced mechanisms is to be applied for which uplink transmission. Different implementations of the embodiment are possible on how to control the use of these two mechanisms for the UEs as will be explained in the following examples, which however should not be construed as limiting the invention. As already explained before, the amount of time for the additional uplink transmission timing offset may be specifically indicated per scheduled uplink transmission, or alternatively be configured in the UE by other means. Furthermore, as was also mentioned before, whether or not the UE has to apply the timing offset to a particular uplink transmission may also be indicated specifically by the eNodeB (e.g., as part of the resource allocation for this uplink transmission) or by an uplink transmission type pattern.

The same concepts can be applied to implement control of the second mechanism to selectively shorten the length of particular uplink transmissions. For example, the amount (e.g., the number of OFDM symbols) by which the uplink transmission should be shortened may be indicated directly by the eNodeB to the UE for each of particular uplink transmissions, e.g., as part of the resource allocation. Alternatively, the amount of shortening could also be configured in the UE(s) e.g., when setting up the unlicensed cell by use of RRC signaling, or may be preconfigured as a fixed indication in the standard or USIM card. Then, whether or not a particular uplink transmission should be shortened at all can be indicated by the eNodeB to the UE, e.g., as part of the resource allocation for said particular uplink transmission. Alternatively, instead of being directly indicated by the eNodeB for each particular uplink transmission, the pattern already described in connection with the first mechanism of implementing the timing offset can be extended so as take into account the second mechanism of shortening the uplink transmission length too. For example, the pattern would thus define for each subframe whether the first and/or second mechanism (and possibly which time offset and which shortening) should be applied or not. Correspondingly, the UE, being scheduled to perform an uplink transmission for a particular subframe, will determine whether and how to apply the first and second mechanism based on this pattern and the particular subframe for which it was scheduled.

In essence, the UEs under control of the eNodeB shall unequivocally be able to determine how to perform an uplink transmission scheduled by the eNodeB. As explained above, this may be directly indicated by the eNodeB for each and every particular uplink transmission or may be preconfigured in the UE without the eNodeB having to specifically indicate this for each uplink transmission.

According to one exemplary implementation of the embodiment, four combinations of the mechanisms need to be differentiated (see also the 4 different types discussed later) by use of e.g., 2 bits. The uplink resource allocation transmitted from the eNodeB to the UE(s) could be extended by these 2 bits so as to additionally instruct the UE on how to perform the uplink transmission, i.e., on whether or not to apply the first and/or second mechanism as explained above. Correspondingly, a new DCI format could be introduced for such an uplink resource allocation, e.g., DCI Format 0A, which may be similar to the DCI Format 0 already defined in the standard, however additionally including a corresponding 2-bit field for the type indication. Alternatively, a not-used field of the DCI Format 0 could be reused in said respect; for instance the RBA field may not be used when assuming that the LAA uplink allocations will always be wideband, such that the bits of the RBA field could be used to indicate which mechanism(s) to apply to the uplink transmission. Thus, no new DCI format needs to be introduced.

These indications may also be extended to additionally indicate which time offset and/or which shortening should be applied. As mentioned before, different amounts of times for the timing offset and/or different amounts of shortening of the uplink transmission shall be supported by the system. Accordingly, more bits would be needed to differentiate between the different possibilities of applying the two mechanisms.

As already mentioned before, the particular uplink transmission sequence happening in an unlicensed cell under control of an eNodeB will dictate whether and which mechanisms are to be used so as to achieve the advantage that a time gap is created between subsequent uplink transmissions so as to allow the (mandatory) CCA to be successfully performed. In order to understand the principles of when and how these mechanisms are to be applied, in the following different exemplary uplink transmission sequences will be taken as scenarios. For discussion purposes, the concept of different types of uplink transmissions will be introduced in the following so as to allow to easily differentiate between the different uplink transmissions with/without time offset and with/without a shortened uplink transmission length. The introduction of different types of uplink transmission shall not be interpreted as being limiting but rather should be regarded as a description tool to differentiate between differing uplink transmissions that could be performed by a UE via an unlicensed cell when applying either one or both of the above discussed mechanisms. The following table gives an overview of the different types and their main characteristics.

|  | | Transmission timing offset | |
|---|---|---|---|
|  |  | No | Yes |
| Shortened uplink transmission length | No | Type A | Type B |
|  | Yes | Type D | Type C |

Figure 13:
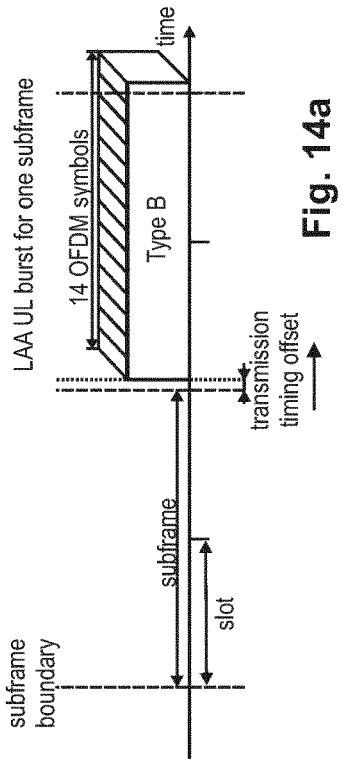
FIG. 13 illustrates an uplink transmission of Type A.

The following FIG. 13-16 illustrate the various different types of uplink transmissions and variations thereof, following the exemplary nomenclature given by the above table. FIG. 13 illustrates a normal uplink transmission (exemplarily termed Type A) which is neither shortened nor offset in relation to its usual uplink transmission timing. In other words, when performing an uplink transmission according to Type A, the UE would follow the timing as given by its subframe boundaries, i.e., would determine the uplink transmission timing based on the downlink reception timing as well as on the timing advance (if instructed by the eNodeB) as explained above.

Figure 14B:
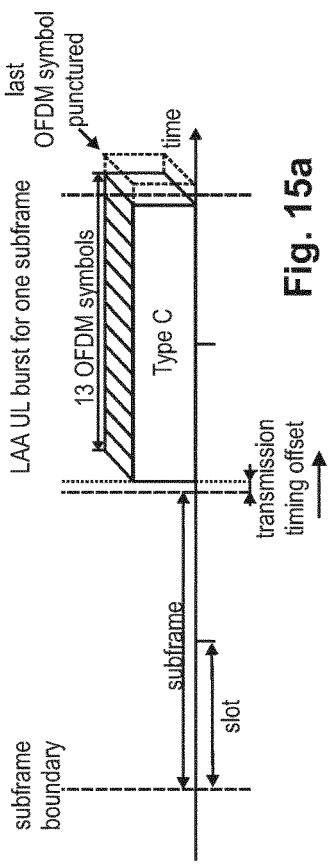
FIGS. 14a-b illustrate an uplink transmission of Type B.
Figure 15B:
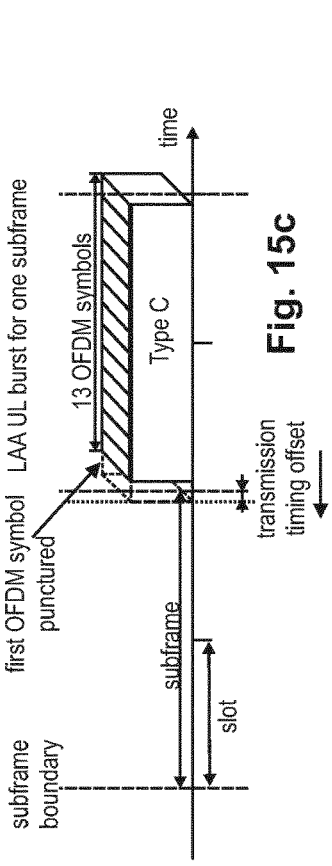
FIGS. 15a-d illustrate an uplink transmission of Type C.
Figure 14A:
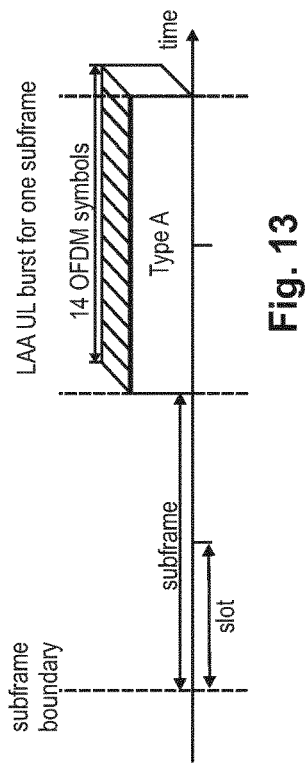
Figure 15A:
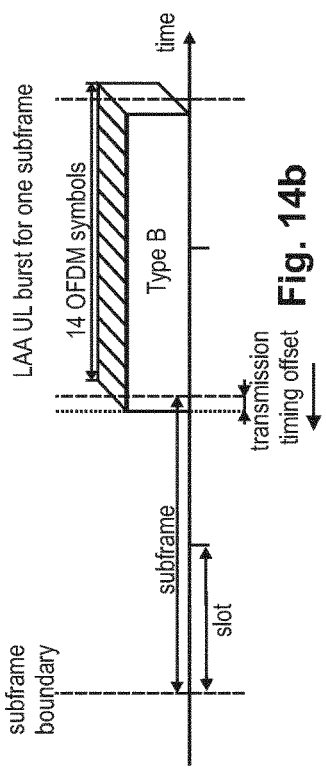
Figure 15C:
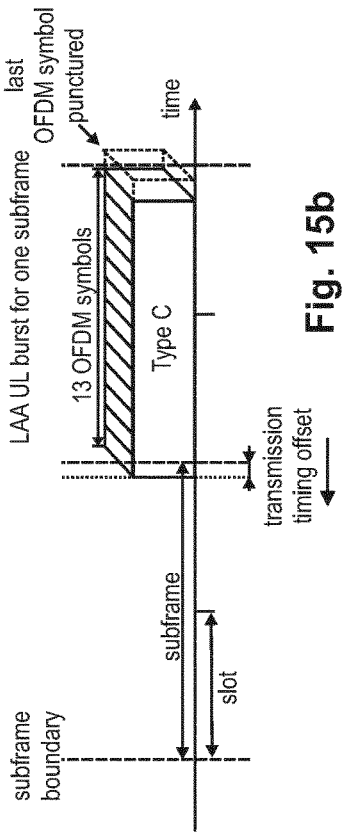

FIG. 14 illustrates uplink transmissions which are offset by a particular amount of time in relation to the usual uplink transmission timing (i.e., subframe boundaries followed by the UE otherwise) (exemplarily termed Type B), where FIG. 14a illustrates an uplink transmission which is postponed, i.e., delayed by a transmission timing offset thus starting and ending after the subframe boundaries. On the other hand, FIG. 14b illustrates an uplink transmission which is preponed, i.e., which is advanced in time by a transmission timing offset, thus starting and ending before the subframe boundaries.

FIG. 15 illustrates uplink transmissions which are offset by a particular amount of time in relation to the usual uplink transmission timing (i.e., subframe boundaries followed by the UE otherwise) and are also shortened in length (in this example by a one OFDM symbol) (exemplarily termed Type C). As apparent from the figures, FIG. 15a illustrates an uplink transmission where the last OFDM symbol is punctured and the uplink transmission timing is postponed. FIG. 15b illustrates an uplink transmission where the last OFDM symbol is punctured and where the uplink transmission timing is advanced in time. FIG. 15c illustrates an uplink transmission where the first OFDM symbol is punctured and where the uplink transmission timing is advanced in time. Finally, FIG. 15d illustrates an uplink transmission where the first OFDM symbol is punctured and the uplink transmission timing is delayed.

Figure 16A:
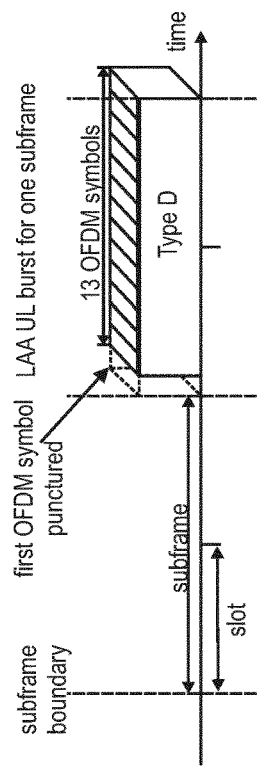
FIGS. 16a-b illustrate an uplink transmission of Type D.
Figure 15D:
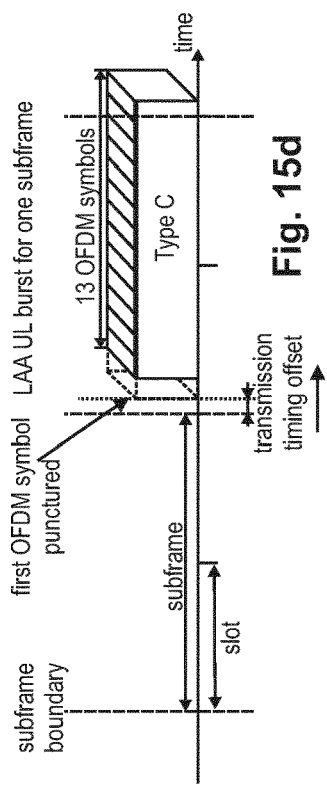
Figure 16B:
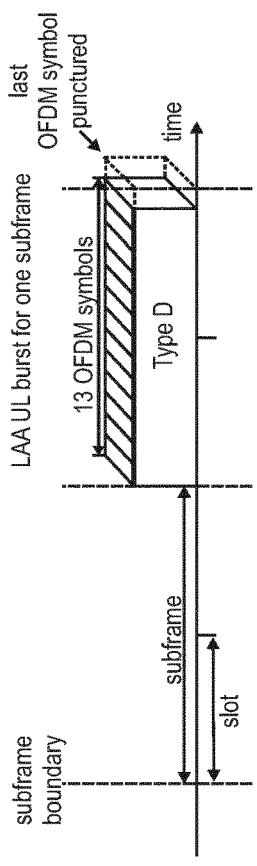

FIG. 16 illustrates uplink transmissions that are shortened in length, in the illustrated examples by one OFDM symbol (exemplarily termed Type D). FIG. 16a illustrates an uplink transmission with a punctured first OFDM symbol, while FIG. 16b illustrates an uplink transmission with a punctured last OFDM symbol.

By selectively applying the two discussed mechanisms, i.e., by performing the uplink transmissions according to the different types, it is possible to create time gaps between subsequent uplink transmissions while at the same time maximizing throughput of the uplink transmissions (i.e., avoiding to unnecessarily shorten the uplink transmission length). As already hinted at above, different uplink transmission sequences (e.g., the number of subsequent uplink transmissions by separate UEs) will require different procedures.

Figure 17:
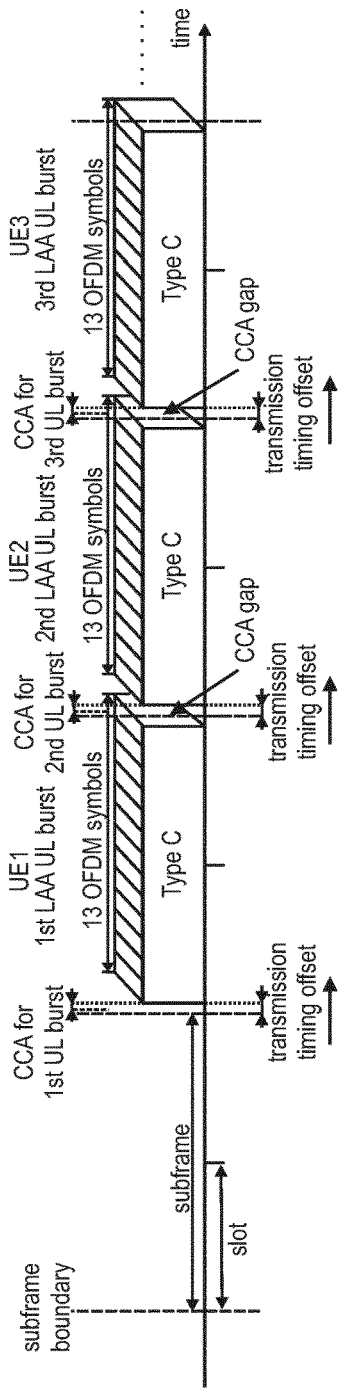

For instance, one possible and simple way of ensuring that a sufficient time gap is available for the CCA can be achieved by always performing the uplink transmissions according to Type C, i.e., with a shortened uplink transmission length and with a particular time offset. This is illustrated in FIG. 17, which exemplarily assumes a time offset to postpone the respective uplink transmission(s) performed by the three UEs, UE1, UE2, and UE3. As apparent from said figure, a CCA gap is created between the first and second uplink burst, and between the second and third uplink burst during which UE2 and UE3 may respectively perform the CCA for their respective uplink transmissions. Therefore, this simple solution would be based on supporting only one type for the uplink transmissions via the unlicensed cell, namely Type C uplink transmissions where the uplink transmission is both shortened and offset by an amount of time with respect to the usually followed subframe boundaries.

However, while this would solve the above discussed problems, it has the disadvantage that an OFDM symbol is discarded for all uplink transmissions, even if it would not be strictly necessary. In the example of FIG. 17, assuming that no further uplink transmission is scheduled for the subframe after the third uplink transmission, it would not have been necessary to shorten the uplink transmission performed by UE3.

Consequently, it may be advantageous to support uplink transmissions according to at least two different types, e.g., types A and C, or types A and B, or B and C, or D and B as will become apparent from the following explanations.

For a sequence comprising only three subsequent uplink transmissions such as the one illustrated in FIG. 17, the last uplink transmission performed by UE3 could also be of type B as illustrated in FIG. 14a or Type A as illustrated in FIG. 13. Consequently, the last uplink transmission would not be shortened while at the same time ensuring that a sufficient time is available for UE 3 to successfully perform the CCA.

Figure 18:
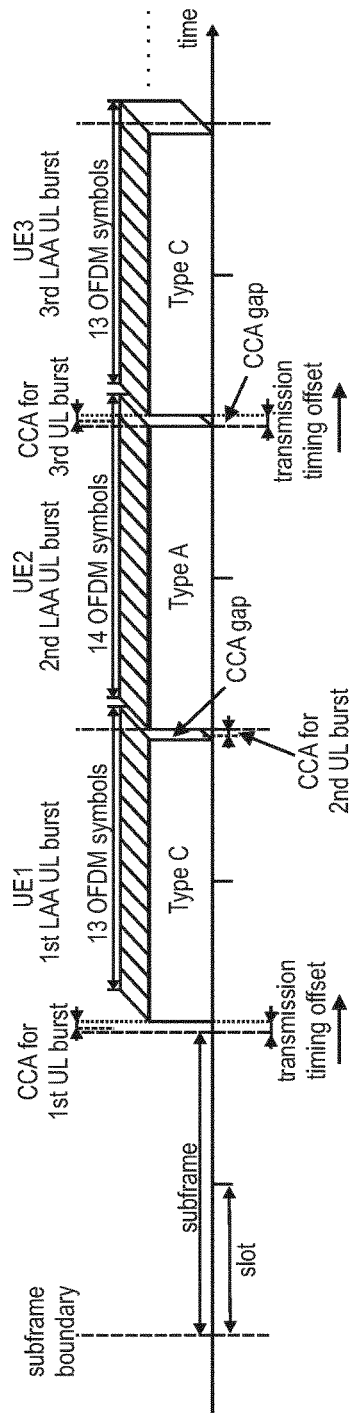
Figure 19:
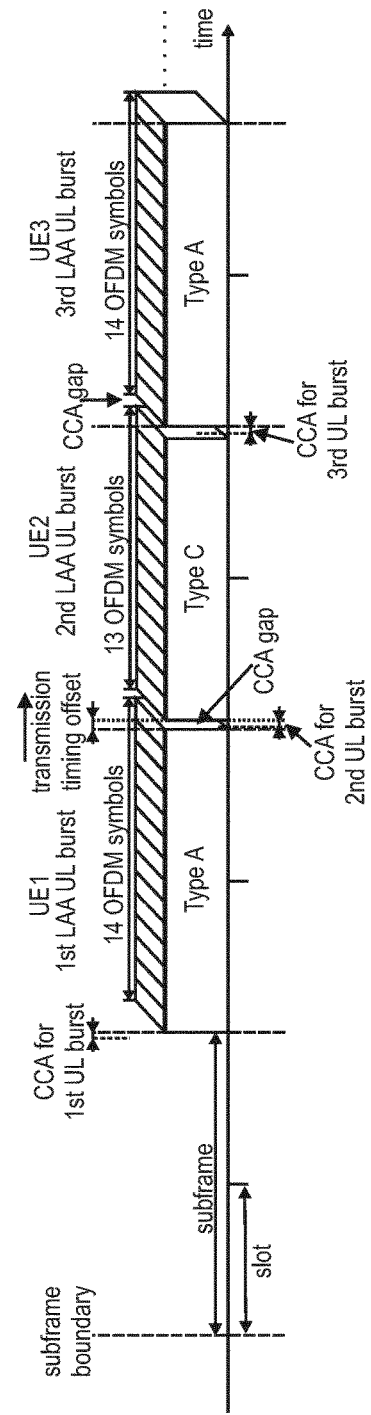

FIGS. 18 and 19 illustrate uplink transmissions alternately performed according to Types C and A. As apparent therefrom, the CCA gap is created in that UE1 and UE3 perform the uplink transmission according to Type C. Such an uplink transmission sequence can continue indefinitely while ensuring that a suitable CCA gap is created between every two directly-subsequent uplink transmissions. In such a sequence, at least one OFDM symbol of every second uplink transmission is discarded.

Figure 20:
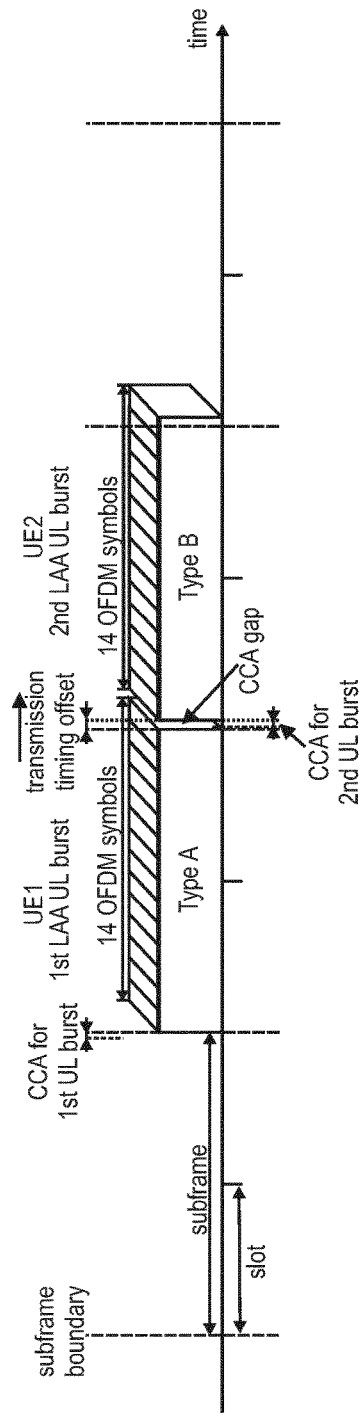

For FIG. 20 it is assumed that only two subsequent uplink transmissions are scheduled by the eNodeB, respectively one to UE1 and UE2. In order to avoid discarding/puncturing any of the OFDM symbols while at the same time allowing the UE2 to perform a CCA for its uplink transmission, UE2 could perform its uplink transmission according to type B, i.e., with an additional delay.

Figure 21:
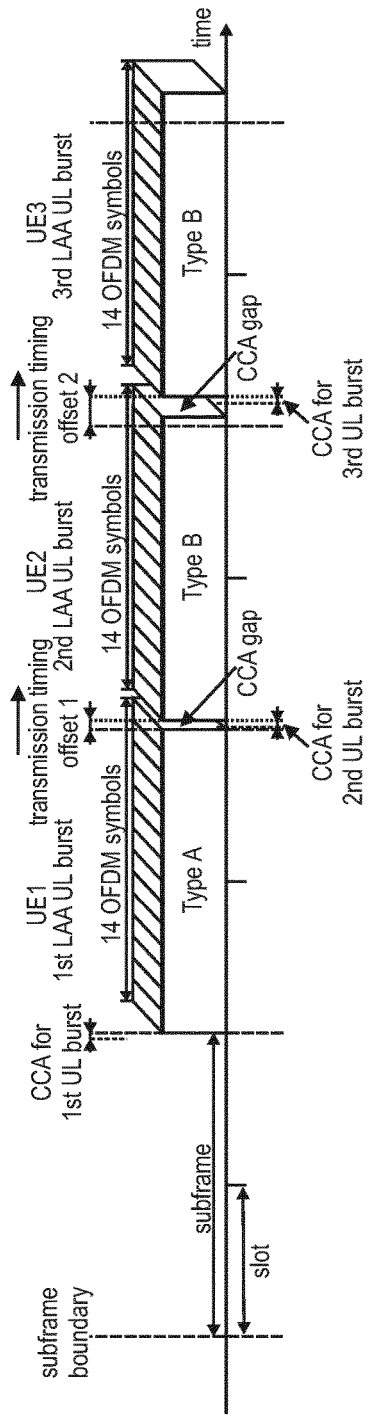

It may also be possible to only support uplink transmissions according to Types A and B so as to avoid unnecessarily discarding OFDM symbols, particularly for cases with a limited number of subsequent uplink transmissions. In particular, as exemplified by FIG. 21, for a sequence of three subsequent uplink transmissions scheduled by an eNodeB to three different UEs, the first UE could be scheduled to perform an uplink transmission according to type A, while the remaining uplink transmissions could be of type B. However, in order for UE3 to have a sufficient time gap for performing a CCA before starting its uplink transmission, the second timing offset applied to the third uplink transmission has to be sufficiently large. Correspondingly, the different time offsets are indicated as "transmission timing offset 1" and "transmission timing offset 2" in FIG. 21. As can be appreciated, applying this sequence of uplink transmission types will lead to an increasing timing offset with an increasing number of uplink transmissions, this having the disadvantage that the reception timing at the eNodeB will equally experience an increased time offset which is detrimental to the overall reception performance at the eNodeB.

Figure 22:
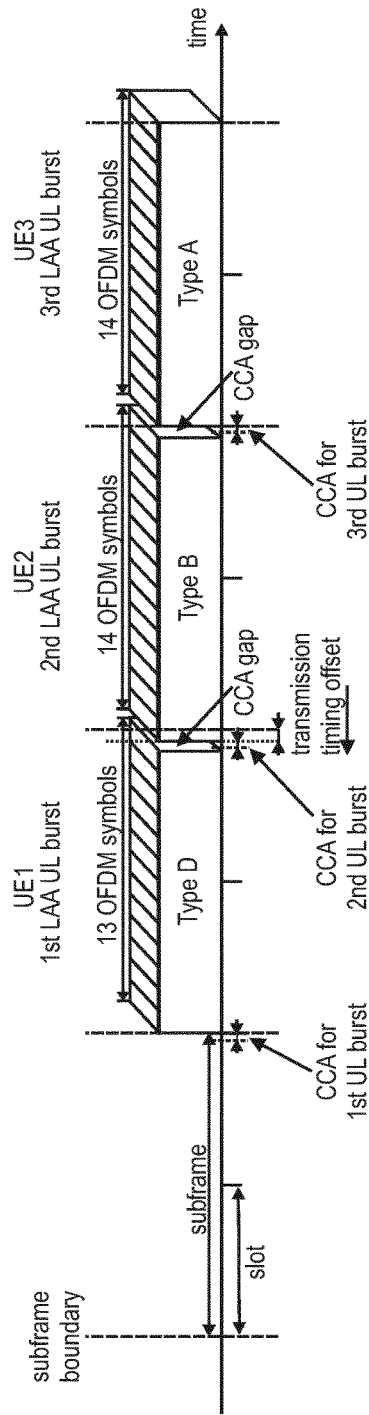

A different sequence of uplink transmission types is illustrated in FIG. 22, exemplary for a sequence of three uplink transmissions by three different UEs, namely a type sequence of DBA. In this particular exemplary scenario, the second uplink transmission of Type B performed by UE2 is advanced in time (rather than delayed), which is possible since the first uplink transmission performed by UE1 is performed according to Type D where the last OFDM symbol is discarded. Consequently, in view of that the second uplink transmission is advanced in time, the third uplink transmission performed by UE3 need not be offset, but may take place at the actual uplink timing as given by the subframe boundary of the UE, and in this example may be according to Type A (assuming that no further time gap needs to be created by said third uplink transmission after the third uplink transmission).

Figure 23:
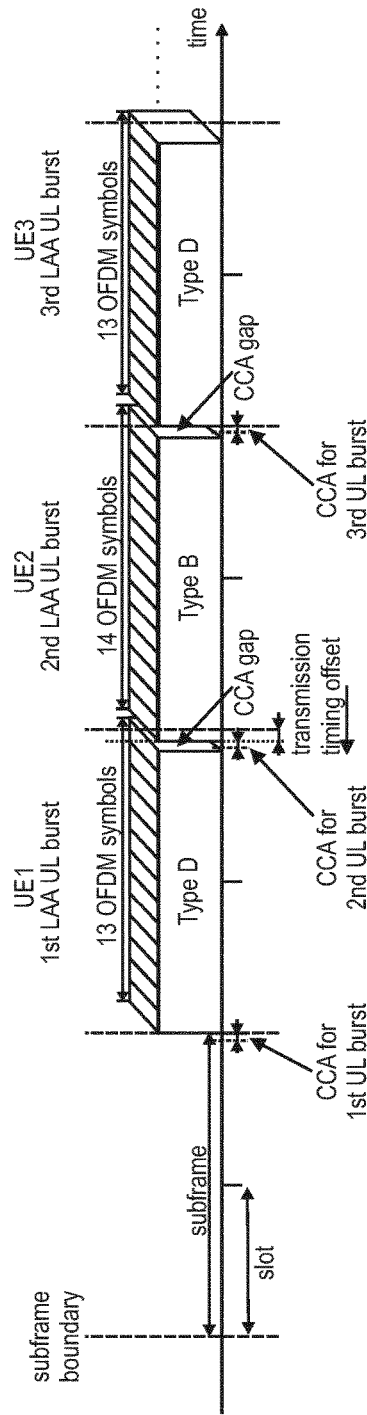

On the other hand, in case a suitable time gap has to be created after the third uplink transmission, UE3 may be controlled to perform an uplink transmission according to Type D, where the last OFDM symbol is punctured. Such a sequence is exemplarily illustrated in FIG. 23, and may equally be continued indefinitely.

So far, it was assumed for illustration purposes that scheduled uplink transmissions span only one subframe. However, the principles so far explained in connection with the first embodiment are equally applicable when allocating several subsequent subframes to one UE, as will be explained in connection with the exemplary scenario illustrated in FIG. 24. Correspondingly, it is assumed that the eNodeB allocates two subsequent uplink subframes to UE1, while allocating the third subframe to UE2. For such an exemplary sequence of uplink transmissions, there are several options on how to create a time gap between the first and the second uplink transmission, such that UE2 is able to perform CCA successfully. For instance, the first uplink transmission could be performed according to Type A, such that the UE1 uses the normal uplink transmission timing as given by the subframe boundaries and does not shorten its uplink transmission. Instead, the second uplink transmission performed by UE2 is performed according to type B, i.e., the start of the uplink transmission is postponed by UE2. As illustrated in FIG. 24, a CCA gap is created in front of the second uplink transmission allowing UE2 to perform its CCA successfully. Alternatively, although not illustrated in any figure, it would also be possible to shorten (discard last OFDM symbol) and/or offset (e.g., advance in time) the first uplink transmission, while performing the second uplink transmission according to type A.

In summary, with the use of FIG. 17-24, it was explained how to selectively apply the first and/or second mechanisms so as to create the necessary CCA gap in the transmission sequence between two subsequent uplink transmissions performed by different UEs. As could be appreciated, either of the two mechanisms could be used standalone (i.e., without the other one; see e.g., FIG. 17). However, it may provide further advantages if the two mechanisms are combined, as explained in connection with these figures.

One possible way for a UE to determine which type of uplink transmission to perform, is to predefine a suitable type pattern in the UE and eNodeB in said respect. For instance, it may be assumed that the type pattern is defined for all subframes of a radio frame, which is based on the assumption that all these subframes may actually be used for performing an uplink transmission. Correspondingly, a possible type pattern for 10 subframes of a radio frame, which may be repetitively applied for each radio frame, is: CCCCC,CCCCC, or CACAC,ACACA, or ACACA,CACAC, or DBDBD,BDBDB, or BDBDB,DBDBD, or DBABD, DBABD. Of course, the just presented type patterns are merely examples and it is immediately apparent that many more patterns could be devised.

Figure 5:
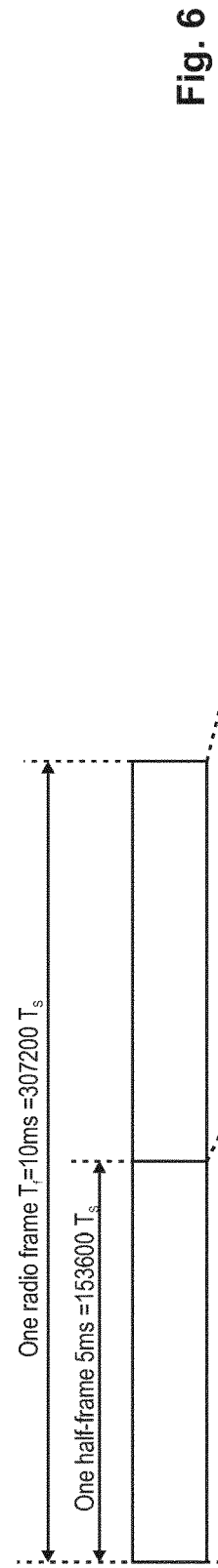
FIG. 5 shows the seven currently-standardized (static) TDD UL/DL configurations 0-6, the respective definitions of the 10 subframes and their switch-point periodicity.
Figure 6:
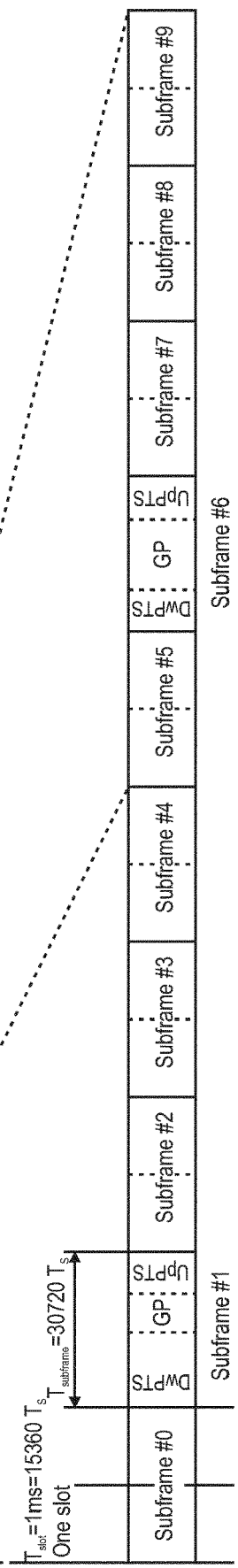
FIG. 6 illustrates the structure of a radio frame, being composed of two half-frames and 10 subframes, for a 5 ms switch-point periodicity.
Figure 7:
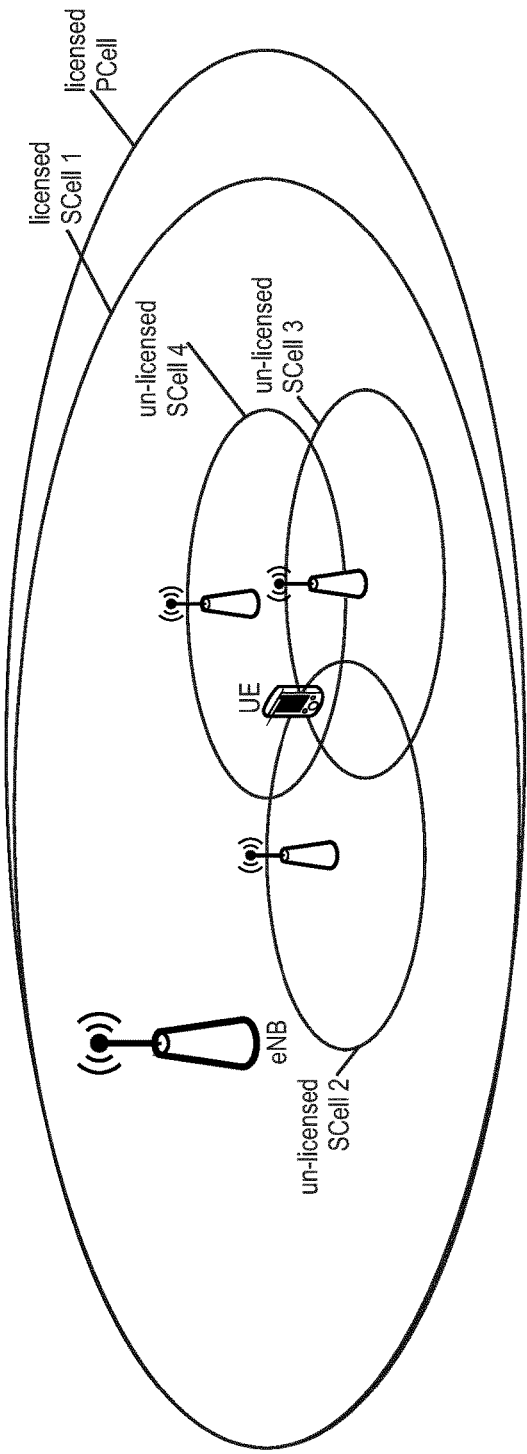
FIG. 7 illustrates an exemplary LAA scenario with several licensed and unlicensed cells.
Figure 8:
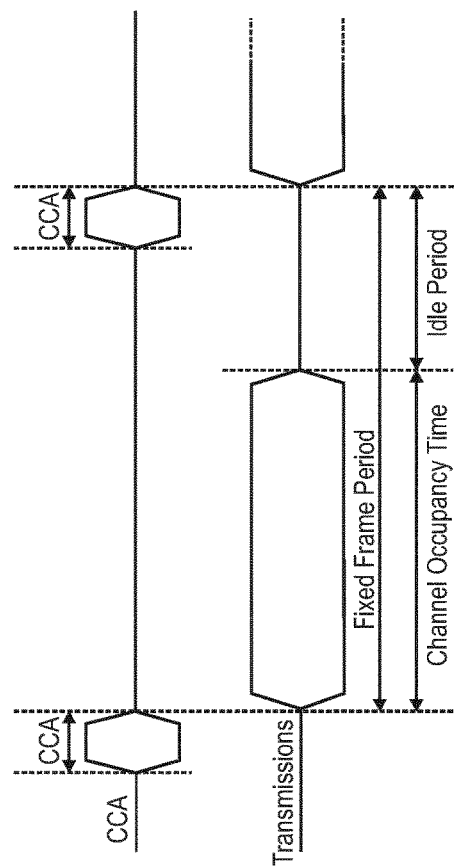
FIG. 8 illustrates the transmission behavior for an LAA transmission.
Figure 9:
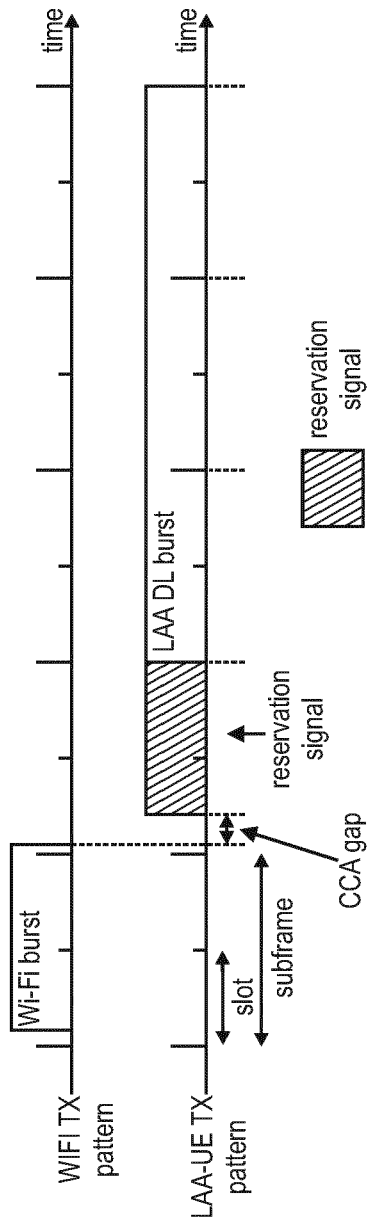
FIG. 9 illustrates the timing between a Wi-Fi transmission and LAA UE downlink burst for an unlicensed cell.

Furthermore, 3GPP may decide to operate the unlicensed cell for uplink and downlink according to a TDD configuration, i.e., such that particular subframes are either for uplink or downlink, possibly further including a special subframe allowing a guard period for switching the RF modules, in a similar manner as the TDD configurations already defined in the standard, as explained in connection with FIG. 5 in the background section. It is assumed for discussion purposes that similar or the same TDD configurations as presented in FIG. 5 in the background section will also be applied to the operation of unlicensed cells. As illustrated in FIG. 5 and FIG. 6, particular sequences of two and up to four subsequent uplink transmissions (special subframe can be considered an uplink transmission too) need to be at least supported. Correspondingly, particular type patterns could be defined for any of these sequences as will be explained in detail in the following.

Assuming a TDD uplink-downlink configuration 0, a sequence of 4 subsequent uplink transmissions (considering the uplink part of a special subframe as a separate uplink transmission) needs to be supported. A possible exemplary type pattern for four subsequent uplink transmissions could be for example CACC. A possible exemplary type pattern for three subsequent uplink transmissions could be for example ACC. A possible exemplary type pattern for two subsequent uplink transmissions could be for example DB. This is exemplarily illustrated in FIG. 25 in connection with the uplink downlink TDD configurations 0, 1 and 2; and is equally applicable to the remaining uplink downlink configurations 3-6 not illustrated in FIG. 25.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A radio base station for scheduling uplink transmissions for a user equipment, comprising:

a processor and transmitter, which, in operation, schedule the uplink transmissions via an unlicensed cell to a user equipment, wherein the unlicensed cell is configured for communication between the user equipment and the radio base station; and a receiver, which, in operation, receives the scheduled uplink transmissions from the user equipment via the unlicensed cell according to different types of uplink transmissions including:

a first type of uplink transmission which spans a complete subframe duration and starts and ends at subframe boundaries followed by the user equipment, a second type of uplink transmission which spans the complete subframe duration, the second type of uplink transmission being offset by a predetermined amount of time with respect to the subframe boundaries followed by the user equipment such that the second type of uplink transmission starts before a first subframe boundary and ends before a second subframe boundary subsequent to the first subframe boundary, or starts after the first subframe boundary and ends after the second subframe boundary subsequent to the first subframe boundary, and a third type of uplink transmission which spans less than the complete subframe duration, the third type of uplink transmission being offset by the predetermined amount of time with respect to the subframe boundaries followed by the user equipment, wherein each of the scheduled uplink transmissions is performed by the user equipment according to one of the different types of uplink transmissions in such a manner that at least a time gap with no uplink transmission occurs between two directly-subsequent uplink transmissions.

2. The radio base station according to claim 1, wherein the different types of uplink transmissions include a further fourth type of uplink transmission which spans less than the complete subframe duration and starts or ends at subframe boundaries followed by the user equipment.

3. The radio base station according to claim 1, wherein:
the processor, in operation, determines the predetermined amount of time; and
the transmitter, in operation, indicates the predetermined amount of time to the user equipment.

4. The radio base station according to claim 1, wherein:
the processor, in operation, determines a type of uplink transmission to be scheduled; and
the determined type of uplink transmission is indicated by the radio base station to the user equipment to be performing the uplink transmission.

5. The radio base station according to claim 1, wherein a type pattern is predetermined in the user equipment and the radio base station, the type pattern defining for each subframe for which an uplink transmission is possible one of the different types of uplink transmissions such that the user equipment and the radio base station determine the type of uplink transmission based on the type pattern and the subframe for which the uplink transmission is scheduled.

6. The radio base station according to claim 1, wherein the time gap between the two directly-subsequent uplink transmissions is usable by another node to perform a clear-channel assessment of an unlicensed band, the clear-channel assessment determining whether or not the unlicensed cell is occupied or not by another transmission.

7. A user equipment for performing uplink transmissions, scheduled by a radio base station, comprising:

a processor, which, in operation, determines a type of an uplink transmission for a scheduled uplink transmission; and a transmitter, which, in operation, performs the uplink transmission according to the determined type via an unlicensed cell configured for communication between the user equipment and the radio base station, wherein the user equipment performs the uplink transmission via the unlicensed cell according to different types of uplink transmissions including:

a first type of uplink transmission which spans a complete subframe duration and starts and ends at subframe boundaries followed by the user equipment;

a second type of uplink transmission which spans the complete subframe duration, the second type of uplink transmission being offset by a predetermined amount of time with respect to the subframe boundaries followed by the user equipment such that the second type of uplink transmission starts before a first subframe boundary and ends before a second subframe boundary subsequent to the first subframe boundary, or starts after the first subframe boundary and ends after the second subframe boundary subsequent to the first subframe boundary; and a third type of uplink transmission which spans less than the complete subframe duration, the third type of uplink transmission being offset by the predetermined amount of time with respect to the subframe boundaries followed by the user equipment, wherein the user equipment performs the uplink transmission in such a manner that at least a time gap with no uplink transmission occurs between two directly-subsequent uplink transmissions.

8. The user equipment according to claim 7, wherein the user equipment performs the uplink transmission via the unlicensed cell according to a fourth type of uplink transmission which spans less than the complete subframe duration and starts or ends at the subframe boundaries followed by the user equipment.

9. The user equipment according to claim 7, wherein the predetermined amount of time is half a length of an OFDM symbol, wherein the user equipment comprises a receiver, which in operation, receives an indication from the radio base station indicating the predetermined amount of time.

10. The user equipment according to claim 7, wherein the user equipment comprises a receiver, which, in operation, receives a type indication from the radio base station indicating the type of uplink transmission to be performed.

11. The user equipment according to claim 7, wherein the user equipment comprises a storage, which, in operation, stores a type pattern defining for each subframe for which an uplink transmission is possible at least one of the different types of uplink transmissions, wherein the processor, when in operation, determines the type of uplink transmission for an uplink transmission based on the type pattern and the subframe for which the uplink transmission is scheduled.

12. The user equipment according to claim 7, wherein:
a length of the uplink transmission of the third and fourth type spans 13 OFDM symbols, and a length of the uplink transmissions of the first and second type spans 14 OFDM symbols,
the subframe boundaries followed by the user equipment are determined based on a timing advance procedure performed between the user equipment and the radio base station, or
the transmitter, in operation, starts an uplink transmission via a licensed cell, with which the user equipment is configured for communication between the user equipment and the radio base station, at a time given by one of the subframe boundaries.

13. A system comprising:
    at least one user equipment; and
    a radio base station, wherein at least one unlicensed cell is configured for communication between the at least one user equipment and the radio base station, wherein the at least one user equipment performs an uplink transmission via the unlicensed cell according to different types of uplink transmissions including:
        a first type of uplink transmission which spans a complete subframe duration and starts and ends at subframe boundaries followed by the user equipment,
        a second type of uplink transmission which spans the complete subframe duration, the second type of uplink transmission being offset by a predetermined amount of time with respect to subframe boundaries followed by the user equipment such that the second type of uplink transmission starts before a first subframe boundary and ends before a second subframe boundary subsequent to the first subframe boundary, or starts after the first subframe boundary and ends after the second subframe boundary subsequent to the first subframe boundary, and
        a third type of uplink transmission which spans less than the complete subframe duration, the uplink transmission being offset by the predetermined amount of time with respect to the subframe boundaries followed by the user equipment,
    wherein the radio base station comprises:
        a processor and transmitter, which, in operation, schedule the uplink transmissions via the unlicensed cell to the at least one user equipment; and
        a receiver, which, in operation, receives the scheduled uplink transmissions,
    wherein the user equipment comprises:
        a receiver, which, in operation, receives a resource assignment from the radio base station scheduling the uplink transmission;
        a processor, which, in operation, determines one of the different types of uplink transmission for the scheduled uplink transmission; and
        a transmitter, which, in operation, performs the uplink transmission according to the determined type via the unlicensed cell, and wherein each of the scheduled uplink transmissions are performed by the at least one user equipment according to the one of the different types of uplink transmissions in such a manner that a time gap with no uplink transmission occurs at least between two directly-subsequent uplink transmissions.

14. The radio base station according to claim 3, wherein the predetermined amount of time is half a length of an OFDM symbol and the transmitter, in operation, indicates the predetermined amount of time using Radio Resource Control (RRC) signaling.

15. The radio base station according to claim 3, wherein the predetermined amount of time by the second type of uplink transmission is offset is a length of an OFDM symbol.

16. The radio base station according to claim 4, wherein the determined type of uplink transmission is indicated to the user equipment together with a resource assignment for the uplink transmission of the determined type, and wherein the determined type of uplink transmission is indicated in a bit field of the resource assignment transmitted to the user equipment.

17. The radio base station according to claim 6, wherein the another node is a Wi-Fi node or another user equipment.

18. The user equipment according to claim 9, wherein the receiver, in operation, receives the predetermined amount of time using Radio Resource Control (RRC) signaling, and wherein the predetermined amount of time, by which the second type of uplink transmission is offset, is the length of an OFDM symbol.

19. The user equipment according to claim 10, wherein the receiver, in operation, receives the type indication together with a resource assignment for the uplink transmission to be performed, and wherein the type indication is in a bit field of the resource assignment.

20. The user equipment according to claim 11, wherein a first type pattern is predetermined for a sequence of two uplink transmissions, wherein the first type pattern defining the third type for a first of the two uplink transmissions and defining the first type for a second of the two uplink transmissions, wherein a second type pattern is predetermined for a sequence of three uplink transmissions, the second type pattern defining a fourth type for a first of the three uplink transmissions, defining the second type for a second of the three uplink transmissions, and defining the first or fourth type for a third of the three uplink transmissions.

* * * * *

UNITED STATES PATENT AND TRADEMARK OFFICE
CERTIFICATE OF CORRECTION

PATENT NO. : 10,728,918 B2
APPLICATION NO. : 15/767983
DATED : July 28, 2020
INVENTOR(S) : Michael Einhaus et al.

Page 1 of 1

It is certified that error appears in the above-identified patent and that said Letters Patent is hereby corrected as shown below:

On the Title Page

Item (30) Foreign Application Priority Data:
"Oct. 16, 2016 (EP) ...... 15190257" should read, --Oct. 16, 2015 (EP) ...... 15190257--.

Signed and Sealed this
Fifteenth Day of September, 2020

Andrei Iancu
*Director of the United States Patent and Trademark Office*